(12) United States Patent
Strandborg et al.

(10) Patent No.: US 11,094,089 B1
(45) Date of Patent: Aug. 17, 2021

(54) FOVEATION-BASED ENCODING AND DECODING OF IMAGES

(71) Applicant: Varjo Technologies Oy, Helsinki (FI)

(72) Inventors: Mikko Strandborg, Hangonkylä (FI); Ville Miettinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 24 days.

(21) Appl. No.: 16/821,157

(22) Filed: Mar. 17, 2020

(51) Int. Cl.
| | |
|---|---|
| *G06K 9/00* | (2006.01) |
| *G06T 9/00* | (2006.01) |
| *G06T 3/40* | (2006.01) |
| *G06F 3/01* | (2006.01) |
| *G06T 7/20* | (2017.01) |

(52) U.S. Cl.
CPC .............. *G06T 9/00* (2013.01); *G06F 3/013* (2013.01); *G06T 3/40* (2013.01); *G06T 7/20* (2013.01); *G06T 2207/20021* (2013.01)

(58) Field of Classification Search
CPC ......... G06T 1/0021; G06T 15/10; G06T 7/55; G06T 3/40; G06T 19/003; G06T 5/002; G06T 5/003; G06T 5/50; G06T 7/0002; G06T 9/002; G06T 2207/20084; G06T 2207/20172; G06T 2207/20182; G06T 9/00; G06T 7/20; G06T 2207/20021; H04N 1/32336; H04N 13/0275; H04N 13/0278; H04N 13/0282; G06F 16/583; G06F 3/013; G06K 9/00201; G06N 20/20; G06N 3/0454; G06N 3/063; G06N 3/08

See application file for complete search history.

(56) References Cited

U.S. PATENT DOCUMENTS

| | | | |
|---|---|---|---|
| 2015/0125078 A1* | 5/2015 | Kitagawa ................ G06T 5/003 382/173 |
| 2018/0136720 A1* | 5/2018 | Spitzer ...................... G06T 1/20 |
| 2018/0261003 A1* | 9/2018 | Peli .......................... G06T 15/08 |
| 2019/0236757 A1* | 8/2019 | Wang ..................... G06F 3/1454 |

* cited by examiner

Primary Examiner — Duy M Dang
(74) Attorney, Agent, or Firm — Ziegler IP Law Group, LLC

(57) ABSTRACT

A method of encoding images and a method of decoding images. The method of encoding comprises dividing an input image into a first input portion and a plurality of input rings that are concentric with the first input portion, the first input portion and the plurality of input rings being shaped as a simple closed curve; storing the first input portion into a first image; packing the plurality of input rings into a second image, second image having a plurality of rows, a given input ring of input image being packed into a corresponding row of second image; and
  communicating, to a display apparatus, the first image, the second image and information indicative of a size of the first input portion and sizes of the plurality of input rings.

20 Claims, 10 Drawing Sheets

FOVEATION-BASED ENCODING AND DECODING OF IMAGES

TECHNICAL FIELD

The present disclosure relates generally to image processing; and more specifically, to methods of encoding images. Moreover, the present disclosure also relates to methods of decoding images.

BACKGROUND

An extended-reality (XR) device requires a sequence of XR images, so as to be able to present an XR environment to a user of the XR device. Typically, the sequence of XR images are obtained by the XR device in a downsampled form. Then, at the XR device, the obtained sequence of XR images (that are in the downsampled form) are upsampled and the upsampled sequence of XR images are rendered at image renderer(s) of the XR device.

Typically, image encoders employ compression techniques such as High Efficiency Video Coding (also known as H.265 and MPEG-H Part 2), H.263, H.264, and the like, for downsampling the sequence of XR images. Correspondingly, image decoders employ suitable decompression techniques (that are compatible with the employed compression techniques) for upsampling the downsampled XR images.

However, conventional image encoders and decoders are limited in their ability to provide XR images to the XR device. The XR images typically include visual content at human-eye resolution (for example, such as 60 pixels per degree). In such a case, using the conventional image encoders and decoders to provide the XR images to the XR device requires considerable storage and transmission resources. Moreover, the conventional image encoders sacrifice image quality to perform a high degree of image downsampling. This loss in image quality of the XR images is perceivable when the downsampled XR images are upsampled (by the conventional image decoders) and rendered at the image renderer(s) of the XR device. In case of XR devices, there is required a high degree immersion of a user within the XR environment, to enable the user to truly experience realism within the XR environment. The perceivable loss in image quality of the XR images reduces the user's immersion within the XR environment.

Therefore, in light of the foregoing discussion, there exists a need to overcome the aforementioned drawbacks associated with compression and decompression techniques employed by conventional image encoders and decoders.

SUMMARY

The present disclosure seeks to provide a method of encoding images. The present disclosure also seeks to provide a method of decoding images. The present disclosure seeks to provide a solution to the existing problems of low image quality and requirement of considerable storage and transmission resources for provision of extended-reality images to extended-reality devices. An aim of the present disclosure is to provide a solution that overcomes at least partially the problems encountered in prior art, and provides an efficient method of encoding images and an efficient method of decoding images.

In one aspect, an embodiment of the present disclosure provides a method of encoding images, the method comprising:

dividing an input image into a first input portion and a plurality of input rings that are concentric with the first input portion, the first input portion and the plurality of input rings being shaped as a simple closed curve;

storing the first input portion into a first image;

packing the plurality of input rings into a second image, the second image having a plurality of rows, a given input ring of the input image being packed into a corresponding row of the second image; and communicating, to a display apparatus, the first image, the second image and information indicative of a size of the first input portion and sizes of the plurality of input rings.

In another aspect, an embodiment of the present disclosure provides a method of decoding images, the method being implemented at a display apparatus, the method comprising:

obtaining a first image, a second image and information indicative of a size of a first output portion and sizes of a plurality of output rings;

extracting the first output portion from the first image based on the size of the first output portion, the first output portion being shaped as a simple closed curve;

unpacking the plurality of output rings from a plurality of rows of the second image based on the sizes of the plurality of output rings, the plurality of output rings being shaped as the simple closed curve;

assembling the first output portion and the plurality of output rings to generate an output image, wherein the plurality of output rings are concentered with the first output portion; and rendering the output image via at least one image renderer of the display apparatus.

Embodiments of the present disclosure substantially eliminate or at least partially address the aforementioned problems in the prior art, and enable foveation-based encoding and decoding of images.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 2B illustrates a first image, while

Figure 1:
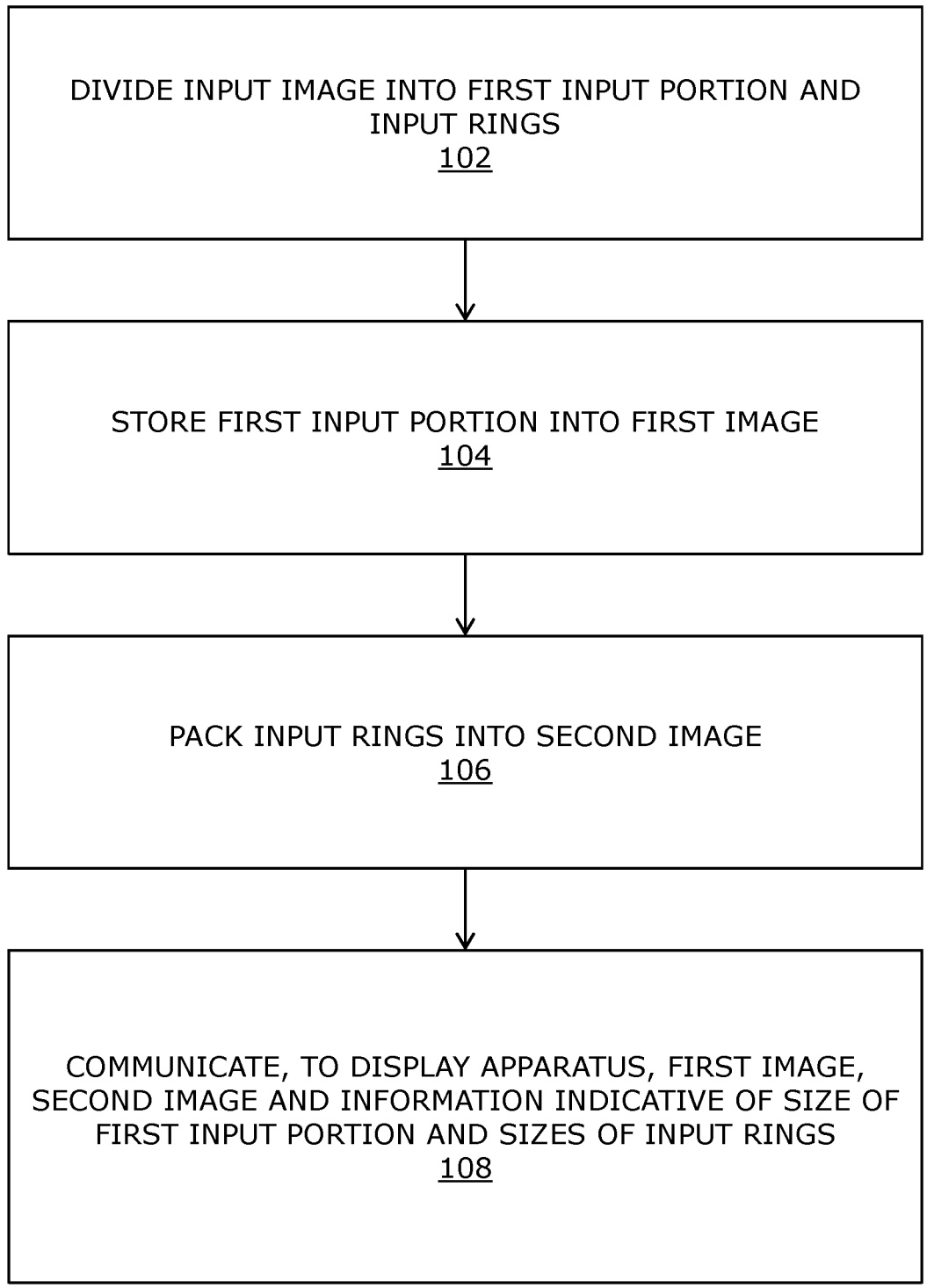
FIG. 1 illustrates steps of a method of encoding images, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method of encoding images, the method comprising:
  dividing an input image into a first input portion and a plurality of input rings that are concentric with the first input portion, the first input portion and the plurality of input rings being shaped as a simple closed curve;
  storing the first input portion into a first image;
  packing the plurality of input rings into a second image, the second image having a plurality of rows, a given input ring of the input image being packed into a corresponding row of the second image; and
  communicating, to a display apparatus, the first image, the second image and information indicative of a size of the first input portion and sizes of the plurality of input rings.

In another aspect, an embodiment of the present disclosure provides a method of decoding images, the method being implemented at a display apparatus, the method comprising:
  obtaining a first image, a second image and information indicative of a size of a first output portion and sizes of a plurality of output rings;
  extracting the first output portion from the first image based on the size of the first output portion, the first output portion being shaped as a simple closed curve;
  unpacking the plurality of output rings from a plurality of rows of the second image based on the sizes of the plurality of output rings, the plurality of output rings being shaped as the simple closed curve;
  assembling the first output portion and the plurality of output rings to generate an output image, wherein the plurality of output rings are concentred with the first output portion; and
  rendering the output image via at least one image renderer of the display apparatus.

The present disclosure provides the aforementioned method of encoding images and the aforementioned method of decoding images. The method of encoding images can be beneficially utilized to pack the input image into a fraction (for example, approximately 2-10 percent) of an original size of the input image without perceived loss in image quality. The method of encoding images utilizes foveation-based packing of data pertaining to the input image for maintaining high image quality whilst reducing image size. Moreover, the first and second images generated upon using the aforesaid method of encoding to encode the input image require lesser storage and transmission resources as compared to the input image. As data transmission requirements are lowered, the first and second images can be conveniently transferred using a wireless communication interface. The method of encoding images allows for handling encoding of corner portions of the input image and discontinuities in the input image in a gradual, graceful manner. The methods of encoding images and decoding images can be utilized to encode and decode visual content of images, depth information of images, transparency information of images, and the like, for efficient transmission and/or rendering of images.

The aforesaid method of encoding images defines an efficient foveation-based technique for image (and video) downsampling, whereas the aforesaid method of decoding images defines an efficient foveation-based technique for image (and video) upsampling. The method of encoding images is implemented via an encoder, whereas the method of decoding images is implemented via a decoder. The encoder and the decoder are described later in more detail.

Throughout the present disclosure, the term "image" refers to visual content, which encompasses not only colour information represented in the image, but also other attributes associated with the image (for example, such as depth information, transparency information, and the like).

The aforesaid method of encoding images is implemented via an encoder. Herein, the term "encoder" refers to specialized equipment that, in operation, encodes images. The encoder encodes the input image to yield the first image and the second image (hereinafter collectively referred to as "encoded images"), wherein the second image is a compact representation of visual content of a specific region of the input image. These encoded images require lesser storage and transmission resources as compared to the input image. When the encoded images are communicated to the display apparatus, the encoded images are transmitted from the encoder to the display apparatus in a bandwidth-efficient manner.

The encoder comprises a processor configured to execute the method of encoding images.

The processor of the encoder is configured to:
  divide the input image into the first input portion and the plurality of input rings that are concentric with the first input portion, the first input portion and the plurality of input rings being shaped as the simple closed curve;

store the first input portion into the first image;

pack the plurality of input rings into the second image, the second image having the plurality of rows, a given input ring of the input image being packed into a corresponding row of the second image; and communicate via a communication interface, to the display apparatus, the first image, the second image and the information indicative of the size of the first input portion and the sizes of the plurality of input rings.

Optionally, the encoder is external to the display apparatus. In other words, the encoder is separate from the display apparatus. In an embodiment, the encoder is wirelessly coupled to the display apparatus, via a wireless communication interface. In another embodiment, the encoder is coupled to the display apparatus in a wired manner, via a wired communication interface.

Throughout the present disclosure, the term "input image" refers to an image that is to be encoded. The input image is encoded and subsequently transmitted to the display apparatus. In particular, the input image is encoded into the first image and the second image. Therefore, the first image and the second image collectively constitute the encoded images of the input image.

Optionally, the input image is an extended-reality image. Throughout the present disclosure, the term "extended-reality" encompasses virtual reality, augmented reality, mixed reality, and the like.

The input image is divided into the first input portion and the plurality of input rings. In other words, the input image is divided into different regions: the first input portion and the plurality of input rings. The plurality of input rings are concentric with the first input portion. In other words, a centre of the first input portion coincides with a centre of each input ring amongst the plurality of input rings.

The first input portion and the plurality of input rings are shaped as a simple closed curve. Herein, the term "simple closed curve" refers to a connected curve that does not cross itself and ends at the same point where it begins. Examples of a given simple closed curve include, but are not limited to, polygons, circles, ellipses, and freeform closed curves. Notably, despite use of the word "curve" in its name, a simple closed curve is not necessarily curved in shape.

It will be appreciated that the given simple closed curve is made up of line segments only, curved lines only, or a combination of line segments and curved lines. When the given simple closed curve is made up of line segments only, the given simple closed curve is a polygon (for example, such as a square, a rectangle, a hexagon, an octagon, and the like). When the given simple closed curve is made up of curved lines only, the given simple closed curve has a curved shape (for example, such as a circle, an ellipse, and the like).

In some implementations, the input image has a uniform spatial resolution in its entirety. In other words, different regions of the input image have same spatial resolution. In other implementations, the input image has a variable spatial resolution. In other words, different regions of the input image have different spatial resolution. Herein, the term "spatial resoluion" of a given region of a given image refers to a number of pixels per degree (also referred to as points per degree (PPD)) in the given region.

Optionally, a spatial resolution of the first input portion is greater than a spatial resolution of the plurality of input rings. Furthermore, optionally, different input rings among the plurality of input rings have different spatial resolutions. Moreover, optionally, spatial resolutions of the plurality of input rings decrease on going from the centre of the plurality of input rings towards a periphery of the input image. Such a decrease in the spatial resolutions may be linear, non-linear, or step-wise.

It will be appreciated that the method of encoding can be used to generate encoded images using not only a single input image, but also using a plurality of input images. In other words, the plurality of input images are used to generate the first image and the second image. As an example, the plurality of input images may comprise:

a first input image having a first spatial resolution; and a second input image having a second spatial resolution, the second spatial resolution being higher than the first spatial resolution, wherein the first input image comprises a first region and a second region surrounding the first region, and the second input image is a zoomed-in representation of the first region of the first input image.

In such an example, the first region of the first input image may correspond to the first input portion, whereas the second region of the first input image may correspond to the plurality of input rings. Therefore, the first input portion is represented in both the first input image as well as the second input image. The second input image may be used to store the first input portion into the first image, as the second spatial resolution is higher than the first spatial resolution. The first input image may be used to pack the plurality of input rings into the second image.

For illustration purposes only, there will now be considered an example implementation wherein an input image having a size equal to 28*28 pixels is divided into a first input portion having a size equal to 8*8 pixels and 3 input rings Q1, Q2 and Q3 that are concentric with the first input portion. The input ring Q1 surrounds the first input portion and has an inner edge length equal to 8 pixels and an outer edge length equal to 10 pixels. The input ring Q2 surrounds the input ring Q1 and has an inner edge length equal to 10 pixels and an outer edge length equal to 16 pixels. The input ring Q3 surrounds the input ring Q2 and has an inner edge length equal to 16 pixels and an outer edge length equal to 28 pixels. An inner edge of the input ring Q1 corresponds to a peripheral edge of the first input portion; an inner edge of the input ring Q2 corresponds to an outer edge of the input ring Q1, and so on. Such an input image has been illustrated in conjunction with FIG. 2A, for the sake of clarity.

According to an embodiment, the first input portion and the plurality of input rings are centred at a centre of the input image. In such a case, a central region of the input image corresponds to the first input portion, whereas a peripheral region of the input image corresponds to the plurality of input rings, wherein the peripheral region surrounds the central region.

In this regard, it will be appreciated that division of the input image into the first input portion and the plurality of input rings is performed according to the centre of the input image. The centre of the input image is the common centre of the first input portion and the plurality of input rings. Generally, a user's gaze is directed towards a centre of his/her field of view. When the user wishes to view objects in a periphery of his/her field of view, the user typically turns his/her head in a manner that said objects lie at a centre of his/her current field of view. In such a case, the central portion of the user's field of view is resolved to a much greater degree of visual detail by the visual system of the user's eye, as compared to the peripheral portion of the user's field of view. This manner of dividing the input image emulates a way in which users generally focus within their field of view. Therefore, this embodiment pertains to fixed-foveation-based encoding of the input image using the method of encoding images.

According to another embodiment, the method of encoding images further comprises:

obtaining, from the display apparatus, information indicative of a gaze direction of a user; and determining a gaze point of the input image based on the gaze direction of the user, wherein the first input portion and the plurality of input rings are centred at the gaze point of the input image.

In this regard, it will be appreciated that division of the input image into the first input portion and the plurality of input rings is performed dynamically, according to the gaze direction of the user. The gaze point of the input image is the common centre of the first input portion and the plurality of input rings. According to known properties of the visual system of the user's eye, the gaze point and a region of the input image that immediately surrounds the gaze point are resolved to a much greater degree of visual detail by the user's eye, as compared to a remaining region of the input image. This dynamic manner of dividing the input image according to a current gaze direction (and specifically, a current gaze point) of the user emulates another manner in which users generally focus within their field of view. Therefore, this embodiment pertains to active-foveation based encoding of the input image using the method of encoding images.

Optionally, the encoder is configured to obtain, from the display apparatus, the information indicative of the gaze direction of the user. Optionally, the processor of the encoder is configured to determine the gaze point of the input image based on the gaze direction of the user.

Throughout the present disclosure, the term "gaze point" refers to a point in a given image that corresponds to the gaze of the user. Notably, the user is not shown the input image, but is instead shown the output image. The gaze direction of the user that is determined whilst the user views a given output image is used for determining a gaze point of an input image corresponding to a next output image. Notably, the gaze direction of the user is mapped to a corresponding point within the input image to determine the gaze point of the input image.

When the input image is divided dynamically in the aforesaid manner, the first input portion corresponds to a region immediately surrounding the gaze point of the input image, whereas the plurality of input rings correspond to a remaining region surrounding the first input portion. The gaze point may or may not be at the centre of the input image. As an example, the gaze point may correspond to a point in a top-right portion of the input image.

In an embodiment, the input image is divided into the first input portion and the plurality of input rings based on a function of an angular distance of a given input ring from a centre of the plurality of input rings, wherein thicknesses of the plurality of input rings increase on going from the centre towards a periphery of the input image according to said function, and wherein the plurality of rows of the second image have a same height.

Optionally, the function of the angular distance of the given input ring from the centre of the plurality of input rings is defined by a Pixels Per Degree (PPD) curve. Optionally, in this regard, the PPD curve is one of: a piecewise linear curve, a non-linear curve or a step-gradient curve. The PPD curve defines an angular resolution (namely, pixels per degree) within the input image.

Throughout the present disclosure, the term "angular distance" refers to an angular separation between two points in a given image. The angular distance can be expressed in terms of degrees or can be converted and expressed in terms of a number of pixels, given the PPD curve for the given image. It will be appreciated that "angular distance" between the two points is converted into the number of pixels between the two points, given the PPD curve, depending on a specific implementation of various components of the display apparatus and a rendering application associated with the display apparatus. The number of pixels between the two points is a distance between the two points.

As an example, the PPD curve may be the following step-gradient curve:

$PPD(x)=60$ PPD when $0 \leq x < x1$; 45 PPD when $x1 \leq x < x2$; 30 PPD when $x2 \leq x < x3$; and 15 PPD when $x3 \leq x \leq x4$ 'x' being a distance of a given point from the centre (of the first input portion and the plurality of input rings), said distance being measured in pixels, and $x1 < x2 < x3 < x4$.

In such an example, the input image is divided in a manner that:

a region bound within a distance x1 from the centre corresponds to the first input portion;

a region bound within distances x1 and x4 from the centre corresponds to the plurality of input rings, wherein a sub-region bound within distances x1 and x2 from the centre corresponds to a first input ring, a sub-region bound within distances x2 and x3 from the centre corresponds to a second input ring, and a sub-region bound within distances x3 and x4 from the centre corresponds to a third input ring.

Moreover, in such an example, when $x2-x1$ is lesser than $x3-x2$, and $x3-x3$ is lesser than $x4-x3$, the plurality of input rings have varying thicknesses that increase on going from the centre towards the periphery of the input image according to the PPD curve;

when $x2-x1$ equals $x3-x2$ and also equals $x4-x3$, the plurality of input rings have a same thickness.

Throughout the present disclosure, the "thickness" of a given ring refers to a distance between a first point on an outer edge of the given ring and a second point on an inner edge of the given ring, the first point and the second point lying along a normal extending between the outer edge and the inner edge. Herein, the term "ring" encompasses both input rings as well as output rings. Throughout the present disclosure, the "height" of a given row of the second image refers to a distance between two opposite boundaries of the given row. The height of the given row may be equal to or smaller than the thickness of the corresponding input ring. The height of the given row is selected as required, so as to enable proper storage of the corresponding input ring. As an example, a given input ring may have a thickness equal to four pixels, whereas its corresponding row in the second image may have a height equal to one pixel.

Optionally, the thicknesses of the plurality of input rings increase on going from the centre towards the periphery of the input image according to said function. An input ring that is closest to the centre has minimum thickness, whereas an input ring that is farthest from the centre has maximum thickness, as the thicknesses of the plurality of input rings increase progressively on going away from the centre towards the periphery of the input image. Therefore, the plurality of input rings have variable thicknesses. It will be appreciated that when the thicknesses of the plurality of input rings is variable and the heights of the plurality of rows of the second image are constant (namely, uniform), different input rings are downsampled to different extents to yield their corresponding rows (having the constant height).

As a first example, the plurality of input rings may comprise 4 input rings a1, a2, a3 and a4, wherein said input rings are arranged sequentially such that the input ring a1 is closest to the centre of the plurality of input rings and the input ring a4 is farthest from the centre. The thicknesses of the plurality of input rings a1-a4 may increase on going from the centre towards the periphery of the input image. For example, the thicknesses of the input rings a1, a2, a3 and a4 may be 1 pixel, 3 pixels, 6 pixels and 10 pixels, respectively. These input rings a1-a4 may be downsampled to different extents such that their corresponding rows b1-b4 of the second image have a constant height of 1 pixel.

Optionally, the thicknesses of the plurality of input rings and the heights of the plurality of rows are measured in pixels. Alternatively, optionally, the thicknesses of the plurality of input rings and the heights of the plurality of rows are measured in degrees.

In another embodiment, the input image is divided into the first input portion and the plurality of input rings in a manner that the plurality of input rings have a same thickness, wherein a height of a given row of the second image depends on a function of an angular distance of a corresponding input ring from a centre of the plurality of input rings.

In this regard, the heights of the plurality of rows decrease as the angular distance of their corresponding input rings from the centre of the plurality of input rings increases. The heights of the plurality of rows are optionally defined by the PPD curve. When all input rings have the same thickness, different rows corresponding to different input rings have variable heights depending on the angular distance of their corresponding input ring from the centre of the plurality of input rings. Closer a given input ring to the centre, greater is a height of its corresponding row. Farther the given input ring from the centre, lesser is the height of its corresponding row. Therefore, the heights of the rows decrease progressively on their corresponding input rings going away from the centre towards the periphery of the input image. In such a case, different input rings are downsampled to different extents to yield their corresponding rows (having varying heights).

As a second example, the plurality of input rings may comprise 4 input rings c1, c2, c3 and c4, wherein said input rings are arranged sequentially such that the input ring c1 is closest to the centre of the plurality of input rings and the input ring c4 is farthest from the centre. The plurality of input rings c1-c4 may have a same thickness equal to 10 pixels. In such an example, heights of rows d1-d4 corresponding to the input rings c1-c4 may vary as the function of the angular distance of the corresponding input ring from the centre of the plurality of input rings. For example, the heights of the rows d1, d2, d3 and d4 may be 10 pixels, 6 pixels, 3 pixels and 1 pixel, respectively.

Optionally, an angular distance of a given input ring from the centre of the plurality of input rings is expressed as a number of pixels between the centre of the plurality of input rings and a middle of the given input ring. The "middle of the given input ring" is a midpoint of a shortest line connecting inner and outer edges of the given input ring.

Optionally, the method of encoding images further comprises communicating, to the display apparatus, information indicative of the function of an angular distance of a given input ring from the centre of the plurality of input rings. Said communication is made from the encoder to the display apparatus (and specifically, to the decoder). This information indicative of the function of the angular distance of the given input ring from the centre of the plurality of input rings is used at the display apparatus whilst executing the method of decoding images. The function of the angular distance of the given input ring from the centre of the plurality of input rings, when analysed along with thicknesses of the plurality of input rings and heights of the plurality of rows of the second image, defines a downsampling ratio of the plurality of input rings. This downsampling ratio is required by the decoder to determine a required upsampling ratio for decoding images.

In some implementations, the information indicative of the function of the angular distance of the given input ring from the centre of the plurality of input rings may be communicated only once to the display apparatus, provided that all input images of a sequence of input images are encoded in a similar manner.

In other implementations, the information indicative of the function of the angular distance of the given input ring from the centre of the plurality of input rings may be communicated repeatedly to the display apparatus, according to a rate at which input images are encoded.

In yet other implementations, the information indicative of the function of the angular distance of the given input ring from the centre of the plurality of input rings may be pre-known to the decoder.

The first input portion is stored into the first image. Throughout the present disclosure, the term "first image" refers to an image that represents the first input portion of the input image. Optionally, the first input portion is copied into the first image. Notably, the first input portion is stored at its original spatial resolution into the first image. A spatial resolution of the first image is same as the original spatial resolution of the first input portion of the input image. The first image can be understood to be an exact copy of visual content of the first input portion. The first image represents an entirety of the visual content of the first input portion, at a same degree of visual detail as the first input portion.

The plurality of input rings are packed into the second image. The second image has a plurality of rows corresponding to the plurality of input rings. A given input ring of the input image is packed entirely into a corresponding row of the second image. Throughout the present disclosure, the term "second image" refers to a downsampled image that is generated by packing the plurality of input rings of the input image, in a compact form. The second image represents visual content of the plurality of input rings in a downsampled form (notably, at a lesser degree of visual detail than the plurality of input rings). Herein, the term "packing" refers to an image processing technique in which the plurality of input rings of the input image are downsampled and rearranged into the second image in a manner that one input ring is packed into one row of the second image.

It will be appreciated that a number of rows of the second image is equal to a number of input rings among the plurality of input rings.

Optionally, the plurality of input rings are packed sequentially into the plurality of rows of the second image. In such a case, an innermost input ring (namely, a first input ring) is packed into a first row (namely, a top row) of the second image, an input ring adjacent to the innermost input ring is packed into a second row of the second image, and so on until an outermost input ring is packed into a last row (namely, a bottom row) of the second image.

Referring to the example implementation described earlier, the 3 input rings Q1, Q2 and Q3 within the input image are packed into the second image in a manner that the input ring Q1 is packed into a first row of the second image, the input ring Q2 is packed into a second row of the second image, and the input ring Q3 is packed into a third row of the second image.

Optionally, when the plurality of input rings having variable thicknesses are packed into the second image, all rows among the plurality of rows of the second image have the same height.

Alternatively, optionally, when the plurality of input rings having the same thickness are packed into the second image, heights of the plurality of rows of the second image decrease on going from the top towards the bottom of the second image according to the function of the angular distance of the corresponding input rings from the centre of the plurality of input rings.

It will be appreciated that a total height of the second image corresponds to a sum of heights of the plurality of rows of the second image. Referring to the first example described above, the total height of the second image including the rows b1-b4 would be equal to 4 pixels as each row has a height of 1 pixel. Referring to the second example described above, the total height of the second image including the rows d1-d4 would be equal to 20 pixels as the heights of the rows d1, d2, d3 and d4 are equal to 10 pixels, 6 pixels, 3 pixels and 1 pixel, respectively.

Optionally, a length of each of the plurality of rows is smaller than or equal to a perimeter of the first input portion. Optionally, when the first input portion is shaped as a regular N-edged polygon, the perimeter of the first input portion is equal to N times an edge length of said polygon. Optionally, when the first input portion is shaped as a circle or an ellipse, the perimeter of the first input portion is equal to a circumference of the circle or the ellipse. It will be appreciated that the length of each of the plurality of rows and the perimeter of the first input portion are measured in pixels.

Optionally, the plurality of rows of the second image have the same length. As an example, the second image may include three rows, wherein each of the three rows has a length equal to 24 pixels. Alternatively, optionally, different rows of the plurality of rows of the second image have different lengths. As an example, a first row (notably, a top row) of the second image may have a length equal to 24 pixels, a second row (notably, a middle row) of the second image may have a length equal to 16 pixels, whereas a third row (notably, a bottom row) of the second image may have a length equal to 8 pixels.

In an embodiment, a length of a given row is equal to the perimeter of the first input portion. In such a case, when the method of decoding images is executed, the given row is used for unpacking of its corresponding output ring without any change in its length. As an example, the first input portion may be octagon-shaped, wherein a length of each edge of the first input portion is equal to five pixels. In such an example, the perimeter of the first input portion is equal to 40 pixels (notably, 8 edges*5 pixels per edge equals 40 pixels). In such an example, the length of the given row may be equal to 40 pixels.

In another embodiment, a length of a given row is smaller than the perimeter of the first input portion. In such a case, when the method of encoding images is executed, the given row is resampled (for example, down-sampled to decrease its length such that its length becomes smaller than the perimeter of the first input portion) and packed into the second image. Such lengthwise downsampling of the given row is described later in more detail. It will be appreciated that smaller the length of the given row, lesser are storage and transmission resources that are required for the given row.

The first image, the second image and the information indicative of the size of the first input portion and the sizes of the plurality of input rings are communicated to the display apparatus. Said communication is made from the encoder to the display apparatus. At the display apparatus, the communicated first image, second image and the information indicative of the size of the first input portion and the sizes of the plurality of input rings are used for decoding images.

The "information indicative of the size of the first input portion and the sizes of the plurality of input rings" comprises at least one of:
 dimensions of the first input portion;
 dimensions of each input ring among the plurality of input rings, wherein said dimensions are measured in pixels;
 mathematical functions employed for determining the dimensions of each input ring among the plurality of input rings.

It will be appreciated that the first image and the second image are communicated repeatedly to the display apparatus, according to a rate at which input images are received (for example, from a camera or a data repository coupled to the encoder). However, the information indicative of the size of the first input portion and sizes of the plurality of input rings could be:
 communicated just once at a time of beginning of operation of the display apparatus;
 communicated repeatedly to the display apparatus, according to a rate at which the first image and the second image are communicated; or
 pre-known to the decoder of the display apparatus.

Optionally, in the method of encoding images, the step of dividing the input image comprises dividing each of the plurality of input rings into M segments, wherein Nth segments of adjacent input rings are packed adjacently in corresponding adjacent rows of the second image. Optionally, in this regard, all M segments of a given input ring are packed adjacently in a corresponding row of the second image, in a sequential manner. In other words, the plurality of input rings are packed row-wise. In such a case, only a first segment and a last segment in a given row are not packed adjacently even though they are adjacent to each other in the input image.

It will be appreciated that in such a case, pixel locality is maintained within the second image. Herein, "pixel locality within the second image" refers to an instance wherein adjacent pixel locations in the input image are also adjacent in the second image. When pixel locality is maintained within the second image, the second image can optionally be downsampled further using one or more video compression algorithms that are well-known in the art.

Optionally, M is an integer that is greater than or equal to three. In other words, M is equal to 3, 4, 5, 6, 7, 8, 9, 10, 11, 12, 13, 14, 15, and so on.

Optionally, a given input ring is divided into M segments along M lines passing through inner and outer edges of the given input ring. In an embodiment, the M lines are equispaced across a length of the given input ring. In another embodiment, the M lines are unequally-spaced across a length of the given input ring. As an example, the plurality of input rings may be divided into 12 segments along 12 lines that pass through inner and outer edges of the plurality of input rings. Such input rings are shown, for example, in FIG. 4.

Referring again to the example implementation described earlier, each of the 3 input rings Q1, Q2, and Q3 may be divided into 4 segments. The input ring Q1 may be divided into 4 segments A1, B1, C1, and D1; the input ring Q2 may be divided into 4 segments A2, B2, C2, and Q2; the input ring Q3 may be divided into 4 segments A3, B3, C3, and D3. In such a case, when packing the 3 input rings Q1, Q2, and Q3 into the second image, Nth segments of adjacent input rings are packed adjacently in corresponding adjacent rows of the second image. In particular, the first segments A1, B1, C1 and D1 are packed adjacently in a first row of the second image; the second segments A2, B2, C2 and D2 are packed adjacently in a second row of the second image, the second row being adjacent to the first row; the third segments A3, B3, C3 and D3 are packed adjacently in a third row of the second image, the third row being adjacent to the second row.

Optionally, for a given pixel of the input image, a location of a corresponding encoded pixel in the second image is computed using the following mathematical function:

$$R(z) = \int_0^z \{1/PPD(x)\} dx$$

where 'z' is a rim index of the given pixel, $R(z)$ is a row index of the given pixel in the second image, 'x' is a distance (in pixels) of the given pixel from the centre of the plurality of input rings, and $PPD(x)$ is a function that describes how many pixels of the input image does the encoded pixel represent. Notably, $PPD(x)$ is used to define thicknesses of the plurality of input rings, as well as to define heights of the plurality of rows of the second image.

Optionally, greater the distance of the given pixel from the centre of the plurality of input rings, greater is the number of pixels of the input image represented by the encoded pixel in the second image.

It will be appreciated that "rim index" of the given pixel is equal to a distance (in pixels) between a projection of the given pixel onto a centre line that is closest to the given pixel and a point from which the centre line extends outwards. Herein, the "centre line" corresponding to a given segment of a given input ring is a line that bisects the given segment across inner and outer edges of the given segment. Moreover, the "row index" of the given pixel refers to an index representative of which row amongst the plurality of rows contains the encoded pixel corresponding to the given pixel.

In an embodiment, a given input ring is divided into M segments that tessellate with each other. A shape of the M segments is selected as one that enables tessellation within the given input ring without any overlaps or gaps. The tessellation may be a regular tessellation, a semi-regular tessellation, a demi-regular tessellation, and the like. For sake of simplicity, segments that tessellate with each other are referred to hereinbelow as "tessellating segments". As an example, the simple closed curve is a rectangle, and the given input ring is divided into four rectangular segments that tessellate with each other. Such input rings are shown, for example, in FIG. 3 and FIG. 6.

Optionally, when a length of each of the M tessellating segments of the given input ring is same across a thickness of each of the M tessellating segments, a horizontal co-ordinate of an encoded pixel (in the second image) corresponding to a given pixel in the input image is computed using the following mathematical function:

$$x = x_0 + (L_{sec}/2) + \{(F(P) \cdot L_{sec})/L_{orig}\}$$

where 'x' is the horizontal co-ordinate of the encoded pixel in the second image, '$x_0$' is a horizontal co-ordinate of beginning of a tessellating segment including the encoded pixel within the second image, '$L_{sec}$' is a length (in pixels) of said tessellating segment in the second image, '$L_{orig}$' is a length (in pixels) of said tessellating segment in the input image, and '$F(P)$' is a signed distance (in pixels) of the given pixel from a centre line corresponding to said tessellating segment. Notably, $F(P)$ is signed to be positive when the given pixel lies towards a right side of said centre line, and negative when the given pixel lies towards a left side of said centre line, wherein left and right sides of the centre line are determined by viewing the centre line from a perspective of its origin at the first input portion. It will be appreciated that the centre line for each tessellating segment is distinct and is defined separately for each tessellating segment.

Figure 5:
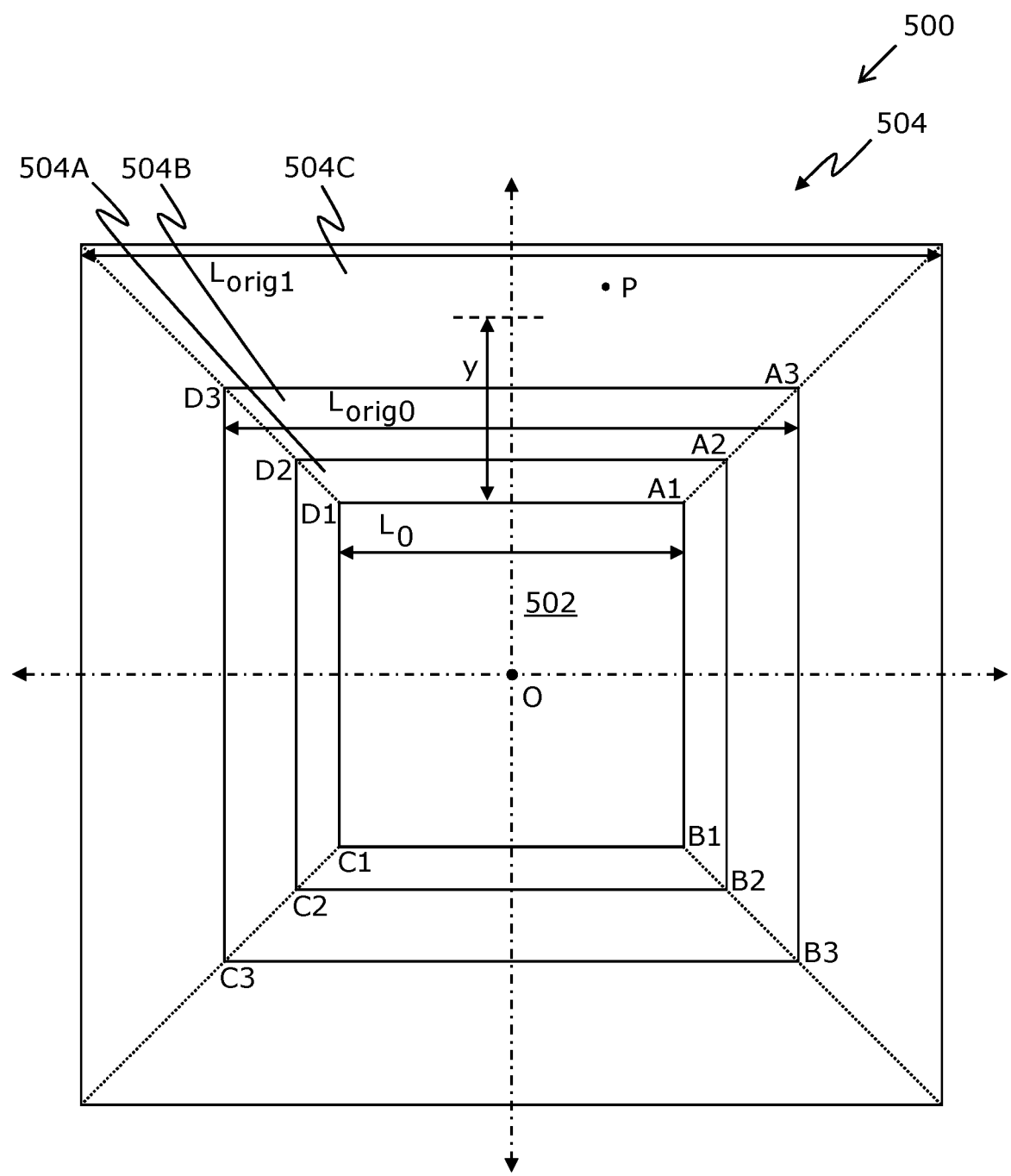
FIGS. 5 and 6 illustrate exemplary measurements pertaining to a given pixel of an input image, in accordance with different embodiments of the present disclosure.
Figure 6:
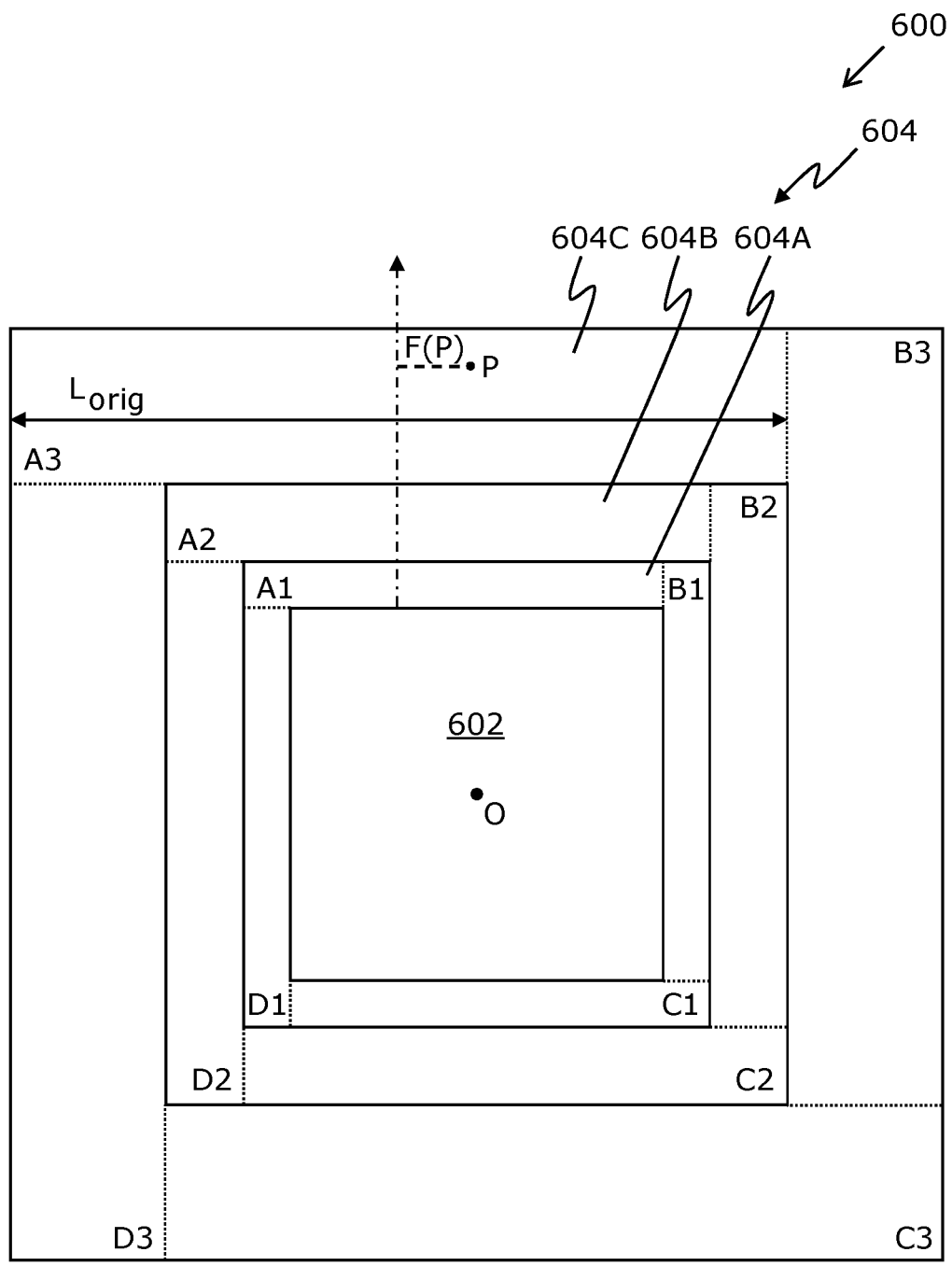

In an example that is illustrated in FIG. 6, the given pixel 'P' may lie in a first tessellating segment of an input ring that is a third input ring (sequentially) from the centre of the plurality of input rings, wherein the given pixel P lies towards a right side of a centre line corresponding to the first tessellating segment. In such an example, '$x_0$' would be equal to zero, as an encoded pixel corresponding to the given pixel P would be packed (into the second image) as a first segment of its corresponding row. Assuming '$L_{sec}$' to be equal to 8 pixels and '$L_{orig}$' to be equal to 16 pixels, and $F(P)$ to be equal to +3 pixels, the horizontal co-ordinate 'x' of the encoded pixel in the second image is calculated as: $x = 0 + (8/2) + \{(3 \cdot 8)/16\} = 5.5$ In another embodiment, the simple closed curve is a polygon having M sides, wherein a given input ring is divided along lines passing through respective pairs of inner and outer corners of the given input ring. Optionally, in this regard, the given input ring is divided into M segments having a trapezoid shape. Notably, when the simple closed curve is a M-sided polygon, the given input ring has M pairs of inner and outer corners. In the M trapezoidal segments, a length of each trapezoidal segment varies across a thickness of each trapezoidal segment. As an example, the simple closed curve is a rectangle, and the given input ring is divided along lines passing through respective four pairs of inner and outer corners of the given ring into four trapezoidal segments. Such input rings are shown, for example, in FIG. 2A and FIG. 5.

Optionally, when the M sides of the polygon have a same length and the given input ring is divided along M lines passing through the respective pairs of inner and outer corners, the given input ring is divided into M trapezoidal segments having a same size. Alternatively, optionally, when the M sides of the polygon have varying lengths and the given input ring is divided along M lines passing through the respective pairs of inner and outer corners, the given input ring is divided into M trapezoidal segments having varying sizes.

Optionally, when given input ring is divided into the M trapezoidal segments, a size of a given trapezoidal segment of the given input ring is deduced using the following mathematical functions:

$R_0 = floor(y)$; $R_0$ being actual row index of a given row corresponding to the given input ring, and $R_1 = ceil(y)$; $R_1$ actual row index of a next row of the given row where 'y' is a distance of a centre of the given trapezoidal segment from a corresponding edge of the first input portion. As an example, for a 1-pixel thick input ring Q1 that surrounds the first input portion, the value of 'y' equals 0.5. Likewise, for a 3-pixel thick input ring Q2 that surrounds the input ring Q1, the value of 'y' equals 2.5, for a 6 pixel thick input ring Q3 that surrounds the input ring Q2, the value of 'y' equals 7, and so on.

Figure 2A:
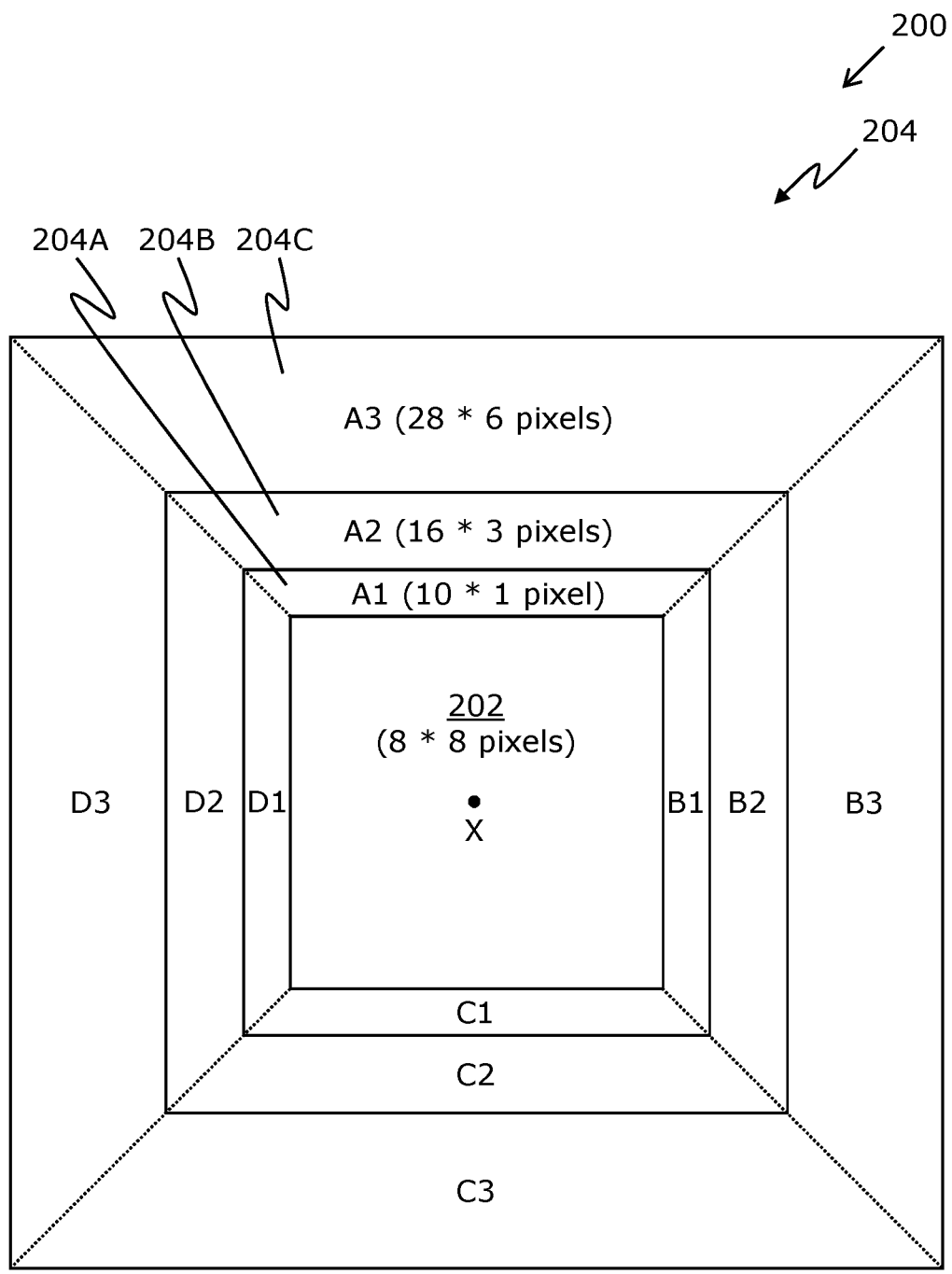
FIG. 2A illustrates how an input image is divided into a first input portion and a plurality of input rings.

Using the above, $R_{orig0}$ and $R_{orig1}$ are defined as a function of $R(R_0)$ and $R(R_1)$ as $R_{orig0}=R(R_0)$ and $R_{orig1}=R(R_1)$ where $R_{orig0}$ is a distance (in pixels) of an inner edge of the given trapezoidal segment from a corresponding edge of the first input portion, while $R_{orig1}$ is a distance (in pixels) of an outer edge of the given trapezoidal segment from said corresponding edge Then, $L_{orig0}=L_0+(2*R_{orig0})$ and $L_{orig1}=L_0+(2*R_{orig1})$ where '$L_0$' is a length of an edge of the first input portion, '$L_{orig1}$' is a length (in pixels) of the inner edge of the given trapezoidal segment, and '$L_{orig1}$' is a length (in pixels) of the outer edge of the given trapezoidal segment In an example input image illustrated in FIG. 2A, when the given pixel lies in a first segment of an input ring that is a first input ring (sequentially) from the centre of the plurality of input rings. In such a case, $y=0.5$; $R_{orig0}=R(R_0)=0$; $R_{orig1}=R(R_1)=1$; $L_{orig0}=L_0+(2*R_{orig0})=8+(2*0)=8$ $L_{orig1}=L_0+(2*R_{orig1})=8+(2*1)=10$ when the given pixel lies in a first segment of an input ring that is a second input ring (sequentially) from the centre of the plurality of input rings. In such a case, $y=2.5$; $R_{orig0}=R(R_0)=1$; $R_{orig1}=R(R_1)=4$; $L_{orig0}=L_0+(2*R_{orig0})=8+(2*1)=10$; $L_{orig1}=L_0+(2*R_{orig1})=8+(2*4)=16$ Optionally, the step of packing a given input ring into a given row of the second image comprises generating a given pixel in the given row by combining a plurality of corresponding pixels in the given input ring. Herein, "combining" refers to an image processing operation pertaining to resampling wherein pixel values of a group of pixels are combined to yield a single resultant pixel value, the single resultant pixel value being associated with a single pixel corresponding to said group of pixels. Therefore, the combining operation incorporates information associated with the group of pixels into the single pixel. Said information pertains to at least one characteristic of a given pixel and a pixel value of the given pixel is a measure of the at least one characteristic. Examples of the at least one characteristic include, but are not limited to, a colour, a depth, a transparency, and a texture. As an example, colour information of four pixels may be combined into a single pixel. In such an example, red-blue-green colour channel intensity values of the four pixels may be averaged to yield resultant red-blue-green colour channel intensity values of the single pixel. Upon combining the plurality of pixels in the given input ring, there are generated a plurality of pixels in the given row corresponding to the given input ring. The number of pixels in the given row is lesser than the number of pixels in the corresponding input ring.

Optionally, when combining the plurality of pixels in the given input ring to generate the given pixel in the given row, there is employed at least one image processing algorithm. The at least one image processing algorithm pertains to image resampling or image rescaling. Optionally, the at least one image processing algorithm is at least one of: pixel binning, weighted averaging, non-linear median filtering, minimum-maximum filtering, interpolation, image scaling (namely, image resizing).

Optionally, a given segment of a given input ring is divided into a plurality of polygonal parts, wherein pixels of a given polygonal part are combined to generate a pixel in a corresponding row of the second image. The polygonal part may, for example, be shaped as a rectangle, a square, a trapezoid, a triangle, and the like.

Optionally, a given row of the second image is downsampled lengthwise in a manner that vertical pixels per degree and horizontal pixels per degree for the given row become equal. The "lengthwise downsampling" of the given row refers to a reduction in resolution of visual content represented in the given row along a length of the given row. It will be appreciated that such lengthwise downsampling of the given row lowers requirement of storage and transmission resources for the given row.

In an embodiment, when packing a given input ring into the given row of the second image, a given pixel in the given row is generated by combining a corresponding group of pixels in the given input ring, wherein a maximum number of pixels that are arranged lengthwise in said group is greater than a maximum number of pixels that are arranged breadthwise in said group. In such a case, a degree of lengthwise downsampling for said group is greater than a degree of breadthwise downsampling for said group. As an example, the given pixel in the given row may be generated by combining six pixels in the given input ring, wherein the six pixels are arranged as a 3*2 grid in the given input ring. In such a case, a maximum number of three pixels are arranged lengthwise, whereas a maximum number of two pixels are arranged breadthwise among the group of six pixels. Therefore, a degree of lengthwise downsampling for the group of six pixels is 3:1, which is greater than a degree of breadthwise downsampling (equal to 2:1) for the group of six pixels.

In another embodiment, upon packing a given input ring into the given row of the second image, pixels in the given row are downsampled lengthwise via a suitable downsampling algorithm.

Optionally, the first image and the second image are assembled into a single image prior to communicating to the display apparatus. This single image is hereinafter referred to as a "composite image" for sake of convenience only. Optionally, the method of encoding images comprises communicating, to the display apparatus, the composite image and the information indicative of the size of the first input portion and the sizes of the plurality of input rings. Optionally, the composite image comprises: a first image and a second image corresponding to a left eye of the user, a first image and a second image corresponding to a right eye of the user, and a padding area. Optionally, in this regard, the padding area comprises a zero-padding array. It will be appreciated that as conventional compression techniques such as High Efficiency Video Coding (also known as H.265 and MPEG-H Part 2), H.263, H.264, and the like, are block-based, addition of a uniform padding area (for example comprising a zero-padding array of W zeros) adds minimal processing overhead at a time of decoding the composite image.

Optionally, the method of encoding images is used for encoding a camera signal from a camera coupled to the encoder. Optionally, in this regard, the information indicative of the gaze direction of the user is used for encoding the camera signal.

Throughout the present disclosure, the term "decoder" refers to specialized equipment that, in operation, decodes the encoded images to yield the output image. Optionally, the output image is an extended-reality image. Optionally, in this regard, a sequence of output images constitutes a visual scene of an extended-reality environment.

The display apparatus comprises the decoder. The decoder is coupled to the at least one image renderer of the display apparatus. The decoder executes the method of decoding images, at the display apparatus, to produce output images (which are decoded images) and communicates the output images to the at least one image renderer for rendering.

Throughout the present disclosure, the term "display apparatus" refers to refers to a specialized equipment that is configured to present the extended-reality environment to the user when the display apparatus in operation is worn by the user on his/her head. In such an instance, the display apparatus acts as a device (for example, such as an extended-reality headset, a pair of extended-reality glasses, and the like) that is operable to present the visual scene of the extended-reality environment to the user. Commonly, the "display apparatus" is referred to as "head-mounted display apparatus", for the sake of convenience only.

The decoder comprises a processor configured to execute the method of decoding images.

The processor of the decoder is configured to:
  obtain the first image, the second image and the information indicative of the size of the first output portion and sizes of the plurality of output rings;
  extract the first output portion from the first image based on the size of the first output portion, the first output portion being shaped as the simple closed curve;
  unpack the plurality of output rings from the plurality of rows of the second image based on the sizes of the plurality of output rings, the plurality of output rings being shaped as the simple closed curve;
  assemble the first output portion and the plurality of output rings to generate the output image, wherein the plurality of output rings are concentred with the first output portion; and
  render the output image via the at least one image renderer of the display apparatus.

The display apparatus (and in particular, the decoder) obtains the first image, the second image and the information indicative of the size of the first output portion and the sizes of the plurality of output rings. Notably, these encoded images and said information are obtained by the decoder from the encoder.

Throughout the present disclosure, the term "information indicative of the size of the first output portion and the sizes of the plurality of output rings" comprises at least one of:
  dimensions of the first output portion;
  dimensions of each output ring among the plurality of output rings, wherein said dimensions are measured in pixels;
  mathematical functions to be employed for determining the dimensions of each output ring among the plurality of output rings.

It will be appreciated that the dimensions of the first output portion are typically same as the dimensions of the first input portion. Likewise, the dimensions of output rings (among the plurality of output rings) are typically same as dimensions of corresponding input rings (among the plurality of input rings).

It will be appreciated that the first image and the second image are obtained repeatedly by the display apparatus, according to the rate at which the first image and the second image are communicated (from the encoder). However, the information indicative of the size of the first output portion and sizes of the plurality of output rings could be:
  obtained just once at the time of beginning of operation of the display apparatus;
  obtained repeatedly by the display apparatus, according to the rate at which the first image and the second image are communicated; or
  pre-known to the decoder of the display apparatus.

Optionally, the method of decoding images comprises obtaining the composite image and the information indicative of the size of the first output portion and sizes of the plurality of output rings.

The first output portion is extracted from the first image, based on the size of the first output portion.

In one embodiment, the size of the first output portion is equal to the size of the first input portion. In such a case, an entirety of the visual content represented in the first image is extracted without any resizing to yield the first output portion.

In another embodiment, the size of the first output portion is smaller than or larger than the size of the first input portion. In such a case, an entirety of the visual content represented in the first image is extracted whilst using an image resizing algorithm that reduces or enlarges a size of the visual content. Such image resizing algorithms (for example, such as linear and bicubic filtering algorithms) are well known in the art.

The first output portion is shaped as a simple closed curve. A shape of said simple closed curve corresponds to a shape of the simple closed curve of the first input portion.

The plurality of output rings are unpacked from the plurality of rows of the second image, based on the sizes of the plurality of output rings. Herein, the term "unpacking" refers to an image processing technique in which the plurality of rows of the second image are upsampled (for example, decompressed) and rearranged into the output image in a manner that one row is unpacked into one output ring of the output image. It will be appreciated that the plurality of output rings are unpacked in a manner that adjacent output rings are unpacked adjacently in the output image.

Optionally, the plurality of output rings are unpacked sequentially from the plurality of rows of the second image. In such a case, an innermost output ring (namely, a first output ring) is unpacked from a first row (namely, a top row) of the second image, an output ring adjacent to the innermost output ring is unpacked from a second row of the second image, and so on until an outermost output ring is unpacked from a last row (namely, a bottom row) of the second image.

Optionally, the number of output rings among the plurality of output rings is equal to the number of input rings among the plurality of input rings.

Optionally, an upsampling ratio that is required for upsampling the plurality of output rings whilst unpacking the plurality of output rings is an inverse of the downsampling ratio of the plurality of input rings. Alternatively, optionally, an upsampling ratio that is required for upsampling the plurality of output rings whilst unpacking the plurality of output rings is lesser than or greater than the inverse of the downsampling ratio of the plurality of input rings. In such a case, the size of the output image would be different from the size of the input image.

Optionally, when all rows among the plurality of rows of the second image have the same height, the plurality of output rings have variable thicknesses. Alternatively, optionally, when the heights of the plurality of rows of the second image are variable, the plurality of output rings have the same thickness. In both these cases, different rows of the second image are upsampled to different extents.

In an embodiment, a size of a given output ring is equal to a size of a corresponding input ring.

In another embodiment, a size of a given output ring is smaller than or larger than a size of a corresponding input ring. It will be appreciated that the size of the given output ring is defined by inner and outer perimeters of the given output ring and a thickness of the given output ring. The size of a given row of the second image is defined by a length of the given row and a height of the given row.

Optionally, a length of each of the plurality of rows is smaller than or equal to a perimeter of the first output portion. Optionally, the perimeter of the first output portion is equal to the perimeter of the first input portion. Optionally, when the first output portion is shaped as a regular N-edged polygon, the perimeter of the first output portion is equal to N times an edge length of said polygon. Optionally, when the first output portion is shaped as a circle or an ellipse, the perimeter of the first output portion is equal to a circumference of the circle or the ellipse. It will be appreciated that the perimeter of the first output portion is measured in pixels.

In an embodiment, a length of a given row is equal to the perimeter of the first output portion. In such a case, when the method of decoding images is executed, the given row is used for unpacking its corresponding output ring without any change in its length. In another embodiment, a length of a given row is smaller than the perimeter of the first output portion.

The first output portion and the plurality of output rings are assembled to generate the output image. The first output portion and the plurality of output rings are different regions of the output image that, when assembled, collectively form the output image. Throughout the present disclosure, the term "output image" refers to an image that is generated upon decoding the encoded images of the input image. Notably, the encoded images are decoded to obtain the different regions of the output image, and the different regions are assembled to yield the output image.

It will be appreciated that the output image is generated in a manner that the first output portion is surrounded by the plurality of output rings. The first output portion and the plurality of output rings are assembled to yield the output image in a manner that a centre of the first output portion coincides with a centre of the plurality of output rings. In other words, the first output portion is concentric with the plurality of output rings.

Optionally, a size of the output image is same as a size of the input image. Alternatively, optionally, a size of the output image is different from a size of the input image. In such a case, the output image may be smaller than or larger than the input image.

Throughout the present disclosure, the term "image renderer" refers to equipment that, when operated, renders the output image. When the output image is rendered, a projection of the output image emanates from an image rendering surface of the at least one image renderer. Then, the projection of the output image is directed towards the user's eyes (via various components of the display apparatus) for showing the output image to the user.

Optionally, a given image renderer is implemented as a display. Optionally, the display is selected from the group consisting of: a Liquid Crystal Display (LCD), a Light Emitting Diode (LED)-based display, an Organic LED (OLED)-based display, a micro OLED-based display, and a Liquid Crystal on Silicon (LCoS)-based display.

Optionally, a given image renderer is implemented as a projector. In this regard, the output image is projected onto a projection screen or directly onto retinas of the user's eyes. Optionally, the projector is selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

According to an embodiment, the first output portion and the plurality of output rings are centred at a centre of the output image. In such a case, a central region of the output image corresponds to the first output portion, whereas a peripheral region of the output image corresponds to the plurality of output rings, wherein the peripheral region surrounds the central region. Moreover, the peripheral region of the output image comprises a plurality of peripheral sub-regions corresponding to the plurality of output rings, wherein a given peripheral sub-region corresponds to a given output ring.

In this regard, it will be appreciated that assembly of the output image is performed according to the centre of the input image. The centre of the output image is the common centre of the first output portion and the plurality of output rings. This manner of assembling the output image emulates a manner in which users generally focus within their field of view. Therefore, this embodiment pertains to fixed-foveation based decoding of the output image using the method of decoding images.

According to another embodiment, the method of decoding images further comprises:
  detecting a gaze direction of a user; and
  determining a gaze point of the output image based on the
    gaze direction of the user,
      wherein the first output portion and the plurality of
        output rings are centred at the gaze point of the
        output image.

In this regard, it will be appreciated that assembly of the output image is performed dynamically, according to the gaze direction of the user. The gaze point of the output image is the common centre of the first output portion and the plurality of output rings. This dynamic manner of assembling the output image according to a current gaze direction (and specifically, a current gaze point) of the user emulates another manner in which users generally focus within their field of view. Therefore, this embodiment pertains to active-foveation based decoding of the output image using the method of decoding images.

When the output image is assembled dynamically in the aforesaid manner, the first output portion corresponds to a region immediately surrounding the gaze point of the output image, whereas the plurality of output rings correspond to a remaining region surrounding the first output portion. The gaze point may or may not be at the centre of the output image. As an example, the gaze point may correspond to a point in a top-right portion of the output image.

Optionally, the display apparatus comprises a means for detecting the gaze direction of the user. Said means, in operation, detects the gaze direction of the user. Throughout the present disclosure, the term "means for detecting the gaze direction" refers to specialized equipment for detecting and/or following a direction of gaze of the user of the display apparatus, when said user views a sequence of output images using the display apparatus. Notably, the gaze direction of the user is detected when the display apparatus in operation is worn by the user. Optionally, the means for detecting the gaze direction is implemented by way of contact lenses with sensors, cameras monitoring the position of the pupil of the user's eye, and the like. Such means for detecting the gaze direction are well-known in the art. Beneficially, the means for detecting the gaze direction is arranged in a manner that said means does not cause any obstruction in an optical path of projections of the sequence of output images.

Optionally, the means for detecting the gaze direction is configured to measure eye-tracking data and process the eye-tracking data to generate a gaze vector indicative of the gaze direction of the user. In this regard, the gaze point of the output image is determined by mapping the gaze vector to a corresponding point (namely, coordinate) in the output image. It will be appreciated that the means for detecting the gaze direction generates the information indicative of the gaze direction of the user, said information comprising at least one of: the eye-tracking data, the gaze vector.

In an embodiment, the plurality of output rings are unpacked from the plurality of rows of the second image based on a function of an angular distance of a given output ring from a centre of the plurality of output rings, wherein thicknesses of the plurality of output rings increase on going from the centre towards a periphery of the output image according to said function, and wherein the plurality of rows of the second image have a same height.

Optionally, the function of the angular distance of the given output ring from the centre of the plurality of output rings is an inverse of the function of the angular distance of the given input ring from the centre of the plurality of input rings. More optionally, the function of the angular distance of the given output ring from the centre of the plurality of output rings is defined by an inverse function of the PPD curve.

Optionally, the thicknesses of the plurality of output rings increase on going from the centre towards the periphery of the output image according to the function of the angular distance of the given output ring from the centre of the plurality of output rings. An output ring that is closest to the centre has minimum thickness, whereas an output ring that is farthest from the centre has maximum thickness, as the thicknesses of the plurality of output rings increase progressively on going away from the centre towards the periphery of the output image. Therefore, the plurality of output rings have variable thicknesses. It will be appreciated that when the thicknesses of the plurality of output rings are variable and the heights of the plurality of rows of the second image are constant (namely, uniform), different output rings are upsampled to different extents while being unpacked from their corresponding rows (having the constant height). As an example, the second image may comprise two rows J1 and J2 of the second image having the same height K, wherein the row J1 corresponds to a first output ring surrounding the first output portion, and the row J2 corresponds to a second output ring surrounding the first output ring. In such an example, the row J1 may be upsampled to a lesser extent than the row J2 to yield a thickness L1 of the first output ring to be lesser than a thickness L2 of the second output ring.

Optionally, the thicknesses of the plurality of output rings are measured in pixels. Alternatively, optionally, the thicknesses of the plurality of output rings are measured in degrees.

In another embodiment, the plurality of output rings have a same thickness, wherein a height of a given row of the second image depends on a function of an angular distance of a corresponding output ring from a centre of the plurality of output rings.

In this regard, the heights of the plurality of rows decrease as the angular distance of their corresponding output rings from the centre of the plurality of output rings increases. When all output rings have the same thickness, different rows corresponding to different output rings have variable heights depending on the angular distance of their corresponding output ring from the centre of the plurality of output rings. Closer a given output ring to the centre, greater is a height of its corresponding row. Farther the given output ring from the centre, lesser is the height of its corresponding row. Therefore, the heights of the rows decrease progressively on their corresponding output rings going away from the centre towards the periphery of the output image. In such a case, different rows are upsampled to different extents to yield their corresponding output rings (having the same thickness). As an example, a first row X1 and a second row X2 of the second image may have heights Y1 and Y2, respectively, wherein Y1 is smaller than Y2. Furthermore, the first row X1 and the second row X2 may correspond to a first output ring and a second output ring, respectively, wherein the first output ring surrounds the first output portion while the second output ring surrounds the first output ring. In such a case, the first row X1 is upsampled to a lesser extent than the second row X2 to yield their corresponding output rings having the same thickness Z.

Optionally, an angular distance of a given output ring from the centre of the plurality of output rings is expressed as a number of pixels between the centre of the plurality of output rings and a middle of the given output ring. The "middle of the given output ring" is a midpoint of a shortest line connecting inner and outer edges of the given output ring.

Optionally, the method of decoding images further comprises obtaining information indicative of the function of an angular distance of a given output ring from the centre of the plurality of output rings. Optionally, the information indicative of the function of the angular distance of the given output ring from the centre of the plurality of output rings is obtained by processing the information indicative of the function of the angular distance of the given input ring from the centre of the plurality of input rings, as the function of the angular distance of the given output ring from the centre of the plurality of output rings is the inverse of the function of the angular distance of the given input ring from the centre of the plurality of input rings. In other words, the information indicative of the function of the angular distance of the given input ring from the centre of the plurality of input rings is used to obtain the information indicative of the function of the angular distance of the given output ring from the centre of the plurality of output rings.

Optionally, the information indicative of the function of the angular distance of the given output ring from the centre of the plurality of output rings is obtained by the decoder.

In some implementations, the information indicative of the function of the angular distance of the given output ring from the centre of the plurality of output rings may be obtained only once, provided that all output images of the sequence of output images are decoded in a similar manner.

In other implementations, the information indicative of the function of the angular distance of the given output ring from the centre of the plurality of output rings may be obtained repeatedly, according to a rate at which the encoded images are decoded.

In yet other implementations, the information indicative of the function of the angular distance of the given output ring from the centre of the plurality of output rings may be pre-known to the decoder.

Optionally, the step of unpacking a given output ring from a given row of the second image comprises unpacking M segments of the given output ring from M columns of the given row, wherein Nth segments of adjacent output rings are unpacked from a same column of corresponding adjacent rows of the second image. Such a manner of unpacking a given output ring is employed when the second image is generated in a manner that each of the plurality of input rings is divided into M segments, Nth segments of adjacent input rings being packed adjacently in corresponding adjacent rows of the second image. According to said manner of unpacking, the plurality of output rings are unpacked column-wise. A given column of the second image is used to unpack the Nth segments of adjacent output rings. When all M columns of the second image are used for unpacking in this manner, all segments of the plurality of output rings are unpacked.

Referring again to the example implementation described earlier, where each of the 3 input rings Q1, Q2, and Q3 were divided into 4 segments and Nth segments of adjacent input rings are packed adjacently in corresponding adjacent rows of the second image, a given output ring W1 (corresponding to the input ring Q1) is unpacked in a manner that 4 segments of the given output ring W1 are unpacked from 4 columns of the first row of the second image, a given output ring W2 (corresponding to the input ring Q2) is unpacked in a manner that 4 segments of the given output ring W1 are unpacked from 4 columns of the first row of the second image, and so on. Notably, Nth segments of adjacent output rings are unpacked from a same column of corresponding adjacent rows of the second image. For example, 1st segments of adjacent output rings W1 and W2 are unpacked from a same column (notably, the first column) of the first and second rows, respectively, of the second image.

It will be appreciated that such a manner of unpacking the plurality of output rings from the plurality of rows of the second image allows for maintaining pixel locality within the output image. Herein, "pixellocality within the ouput image" refers to an instance wherein adjacent pixel locations in the second image are also adjacent in the output image.

Optionally, the step of unpacking the given output ring from the given row of the second image further comprises employing a 'repeat' texture addressing mode. This enables the first segment and the last segment in the given row to be unpacked in a manner that said segments are arranged adjacently within the output image, even though said segments are not packed adjacent to each other in the second image In an embodiment, the M segments of the given output ring are assembled in a manner that the M segments tessellate with each other. Said assembly is done in a manner that enables tessellation within the given output ring without any overlaps or gaps.

In another embodiment, the simple closed curve is a polygon having M sides, wherein the M segments of the given output ring are assembled sequentially to generate the given output ring. Optionally, in this regard, a shape of the M segments of the given output ring corresponds to the M segments of the corresponding input ring. In an example, the M segments of a given input ring and the M segments of its corresponding output ring may have a trapezoid shape. In another example, the M segments of a given input ring and the M segments of its corresponding output ring may have a rectangular shape.

Optionally, the step of unpacking the given output ring from the given row further comprises generating, from a given pixel in the given row, a plurality of corresponding pixels in the given output ring. In this regard, a pixel value of the given pixel is used to generate pixel values of the plurality of corresponding pixels. Notably, the pixel value of the given pixel is used to determine the pixel values of the plurality of corresponding pixels. This would reduce a detail of visual content in the given output ring, as compared to a detail of visual content in a corresponding input ring, even when a spatial resolution of the given output ring matches the spatial resolution of the corresponding input ring. It will be appreciated that even though spatial resolution of the given output ring is a number of pixels per degree in the given output ring, generating multiple pixels from the given pixel would cause loss of detail of visual content of the given output ring.

Optionally, when processing the given pixel in the given row to generate the plurality of corresponding pixels in the given output ring, there is employed at least one image processing algorithm. The at least one image processing algorithm pertains to image resampling or image rescaling. Optionally, the at least one image processing algorithm is at least one of: interpolation, image scaling (namely, image resizing).

It will be appreciated that the methods of encoding images and decoding images can be utilized to provide high-quality output images to the display apparatus. Notably, the first and second images (namely, the encoded images) considerably preserve image quality of the input image. The input image is encoded using a foveation-based encoding technique of the method of encoding, which minimizes loss of the image quality of the input image. The first image exactly preserves the image quality (namely, the detail of visual content) of the first input portion of the input image, whereas the second image preserves a lower image quality of the plurality of input rings of the input image. When these encoded images are decoded using a foveation-based decoding technique of the method of decoding, loss of image quality of the encoded images is also minimal. Then, when the user views the output image generated upon decoding such encoded images, a projection of the first output portion (generated using the first image) is typically incident upon the foveas of the user's eyes, while a projection of the plurality of output rings is typically incident upon remaining regions of the retinas of the user's eyes. As a result, the visual system of the user's eyes would be unable to perceive loss of image quality in the output image, and the user would experience immersion within the output image.

The method of decoding images is essentially a reverse process of the method of encoding images. Various embodiments and variants disclosed above, with respect to the method of encoding images, apply mutatis mutandis to the method of decoding images.

DETAILED DESCRIPTION OF THE DRAWINGS

Referring to FIG. 1, illustrated are steps of a method of encoding images, in accordance with an embodiment of the present disclosure. At step 102, an input image is divided into a first input portion and a plurality of input rings that are concentric with the first input portion. The first input portion and the plurality of input rings are shaped as a simple closed curve. At step 104, the first input portion is stored into a first image. At step 106, the plurality of input rings are packed into a second image. The second image has a plurality of rows. A given input ring of the input image is packed into a corresponding row of the second image. At step 108, the first image, the second image and information indicative of a size of the first input portion and sizes of the plurality of input rings are communicated to a display apparatus.

The steps 102, 104, 106, and 108 are only illustrative and other alternatives can also be provided where one or more steps are added, one or more steps are removed, or one or more steps are provided in a different sequence without departing from the scope of the claims herein.

Figure 2B:
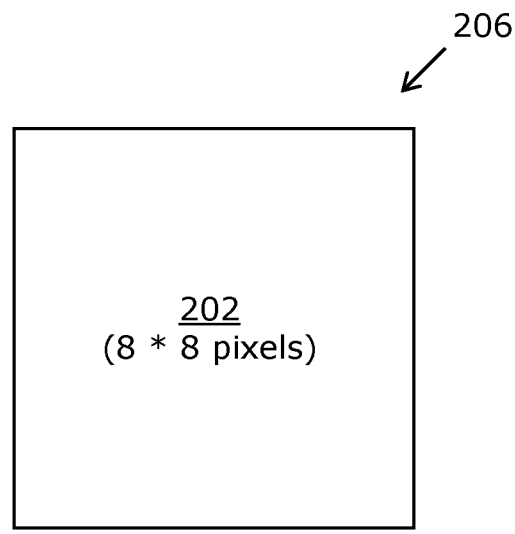
Figure 2C:
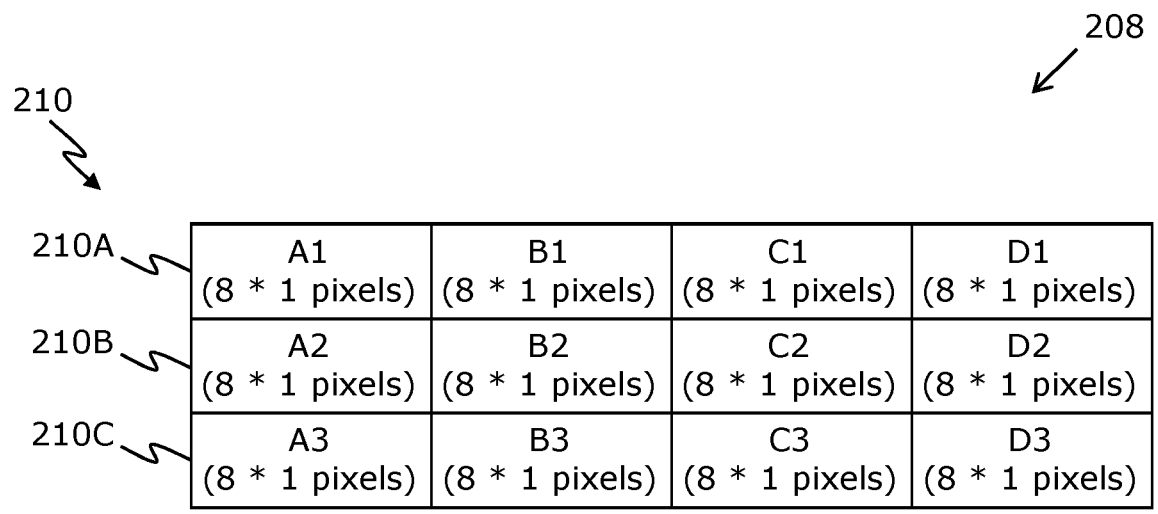
FIG. 2C illustrates a second image, in accordance with an embodiment of the present disclosure.

Referring to FIGS. 2A, 2B and 2C, FIG. 2A illustrates how an input image 200 is divided into a first input portion 202 and a plurality of input rings 204, FIG. 2B illustrates a first image 206, while FIG. 2C illustrates a second image 208, in accordance with an embodiment of the present disclosure.

In FIG. 2A, the input image 200 is shown to be divided into the first input portion 202 and the plurality of input rings 204 (individually depicted as input rings 204A, 204S and 204C) that are concentric with the first input portion 202. The first input portion 202 and the plurality of input rings 204 are centred at a centre X of the input image 200. The first input portion 202 and the plurality of input rings 204 are shaped as rectangles.

The input image 200 is shown to have a square shape and a size equal to 28*28 pixels. The first input portion 202 is shown to have a square shape and a size equal to 8*8 pixels. Thicknesses of the plurality of input rings 204 increase on going from the centre X of the plurality of input rings 204 towards a periphery of the input image 200 according to a function of an angular distance of a given input ring from the centre X of the plurality of input rings 204. As shown, the input ring 204A is one pixel thick, the input ring 204B is three pixels thick, and the input ring 204C is six pixels thick.

Each of the plurality of input rings 204 is divided into four segments. A given input ring is divided along lines (depicted as dotted lines) passing through respective pairs of inner and outer corners of the given input ring. In this regard, each segment of the given input ring has a trapezoid shape. The input ring 204A is divided into segments A, B1, C1 and D1, the input ring 204B is divided into segments A2, B2, C2 and D2, while the input ring 204C is divided into segments A3, B3, C3 and D3.

In FIG. 2B, the first image 206 is shown to store the first input portion 202 of the input image 200. A size of the first image 206 is 8*8 pixels. The first image 206 has a square shape (corresponding to the square shape of the first input portion 202).

In FIG. 2C, the second image 208 is shown to have a plurality of rows 210 (individually depicted as rows 210A, 210B and 210C). The plurality of rows 210 have a same height that is equal to one pixel. Notably, the input ring 204A is packed into the row 210A, the input ring 204B is packed into the row 210B, while the input ring 204C is packed into the row 210C. In particular, $N^{th}$ segments of adjacent input rings are packed adjacently in corresponding adjacent rows of the second image 208. As an example, 1st segments A1 and A2 of adjacent input rings 204A and 204S are packed adjacently in corresponding adjacent rows 210A and 210B, respectively, of the second image 208. Notably, a length of each of the plurality of rows 210 is equal to a perimeter of the first input portion 202. The perimeter of the first input portion 202 is 32 pixels.

Figure 3:
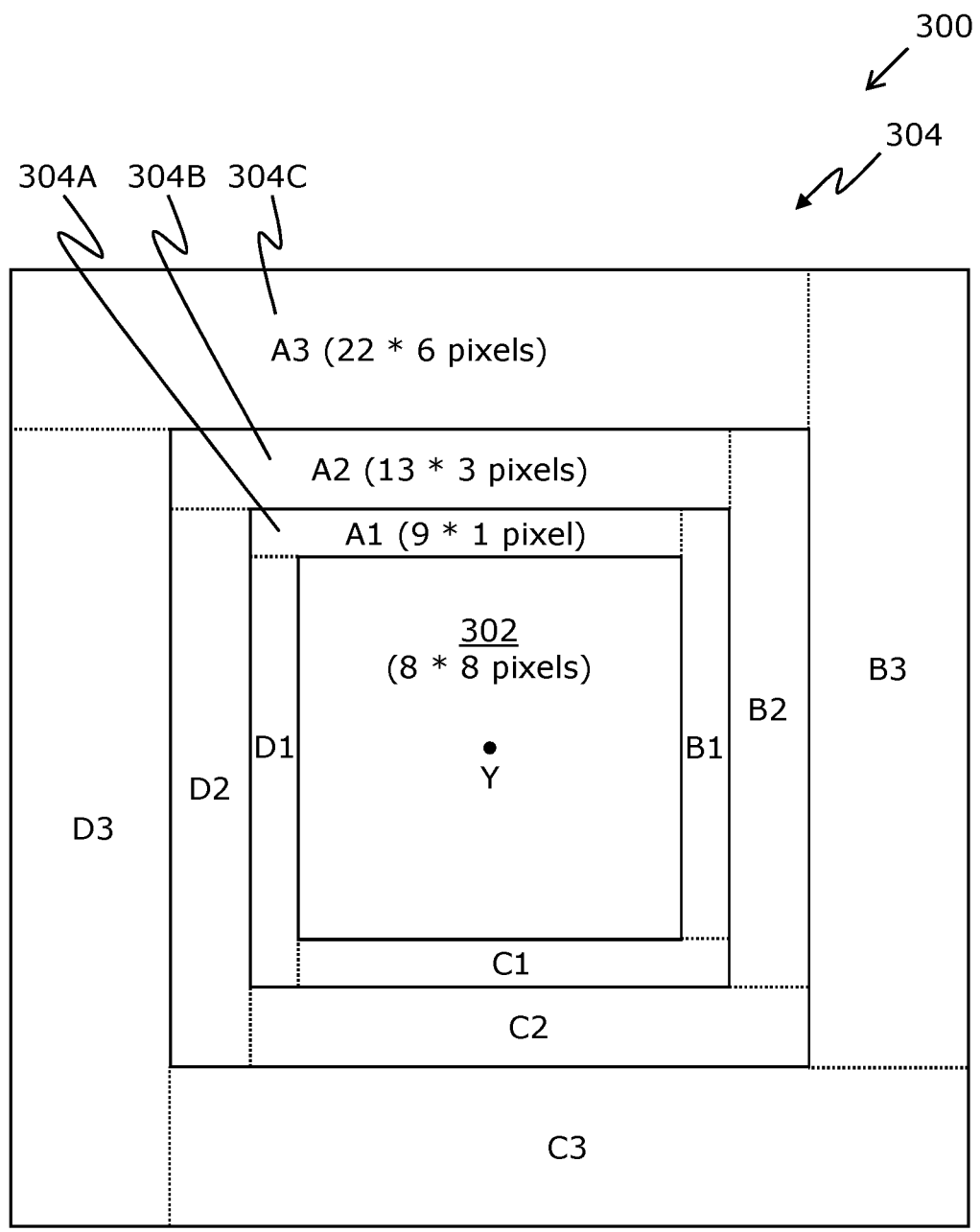
FIG. 3 illustrates how an input image is divided into a first input portion and a plurality of input rings, in accordance with another embodiment of the present disclosure.

Referring to FIG. 3, illustrated is how an input image 300 is divided into a first input portion 302 and a plurality of input rings 304, in accordance with another embodiment of the present disclosure. The plurality of input rings 304 (individually depicted as input rings 304A, 304B and 304C) are concentric with the first input portion 302. The first input portion 302 and the plurality of input rings 304 are centred at a centre Y of the input image 300. The first input portion 302 and the plurality of input rings 304 are shaped as rectangles.

The input image 300 is shown to have a square shape and a size equal to 28*28 pixels. The first input portion 302 is shown to have a square shape and a size equal to 8*8 pixels. Thicknesses of the plurality of input rings 304 increase on going from the centre Y of the plurality of input rings 304 towards a periphery of the input image 300 according to a function of an angular distance of a given input ring from the centre Y of the plurality of input rings 304. As shown, the input ring 304A is one pixel thick, the input ring 304B is three pixels thick, and the input ring 304C is six pixels thick.

Each of the plurality of input rings 304 is divided into four segments that tessellate with each other. Said division is depicted as dotted lines within the input image 300. Each segment has a rectangular shape. The input ring 304A is divided into segments A, B1, C1 and D1, the input ring 304B is divided into segments A2, B2, C2 and D2, while the input ring 304C is divided into segments A3, B3, C3 and D3.

Figure 4:
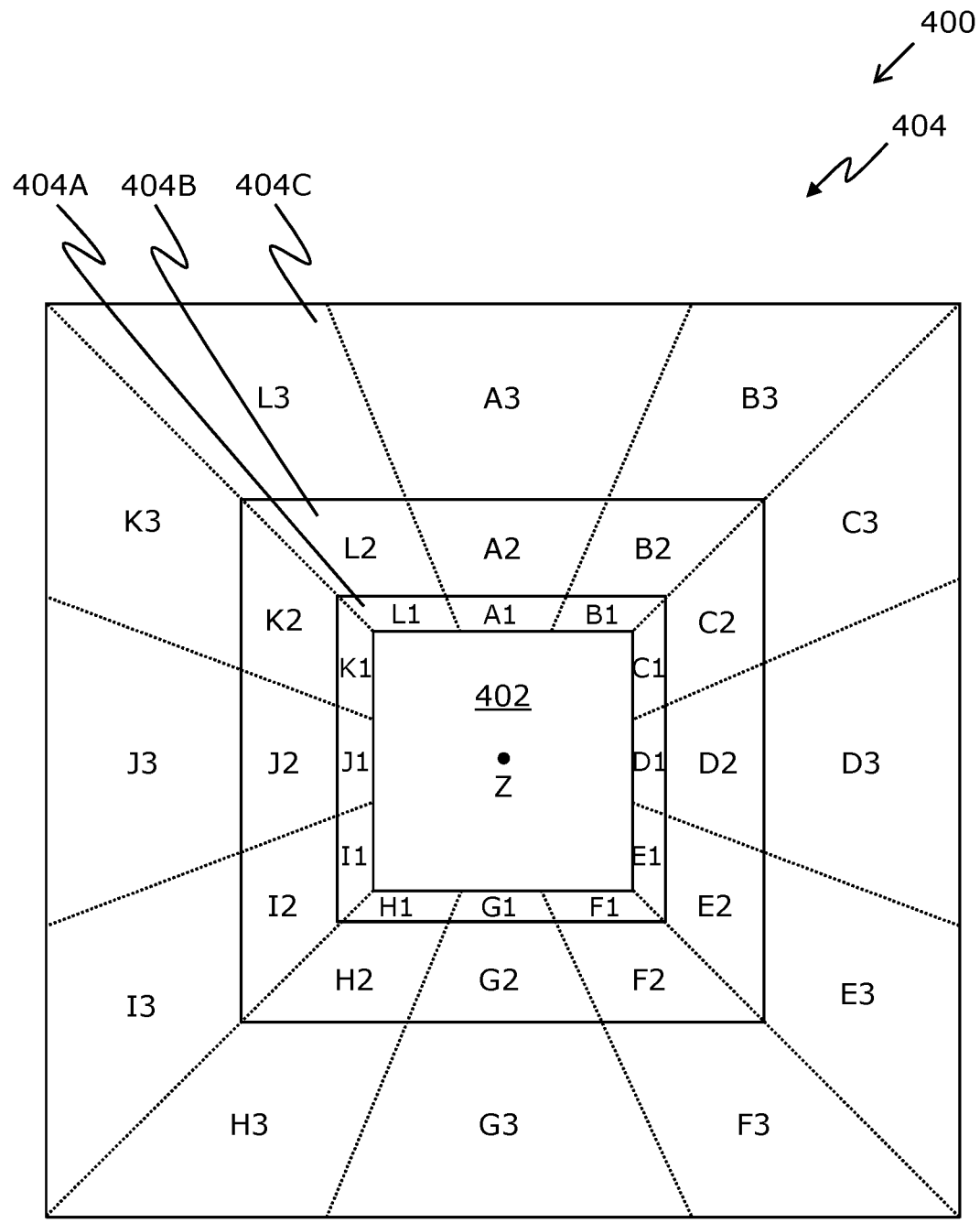
FIG. 4 illustrates how an input image is divided into a first input portion and a plurality of input rings, in accordance with yet another embodiment of the present disclosure.

Referring to FIG. 4, illustrated is how an input image 400 is divided into a first input portion 402 and a plurality of input rings 404, in accordance with yet another embodiment of the present disclosure. The plurality of input rings 404 (individually depicted as input rings 404A, 404B and 404C) are concentric with the first input portion 402. The first input portion 402 and the plurality of input rings 404 are centred at a centre Z of the input image 400. The first input portion 402 and the plurality of input rings 404 are shaped as rectangles.

The input image 400 is shown to have a square shape and a size equal to 28*28 pixels. The first input portion 402 is shown to have a square shape and a size equal to 8*8 pixels. Thicknesses of the plurality of input rings 404 increase on going from the centre Z of the plurality of input rings 404 towards a periphery of the input image 400 according to a function of an angular distance of a given input ring from the centre Z of the plurality of input rings 404. As shown, the input ring 404A is one pixel thick, the input ring 404B is three pixels thick, and the input ring 404C is six pixels thick.

Each of the plurality of input rings 404 is divided into 12 segments that are polygonal in shape. Said division is depicted as dotted lines within each of the plurality of input rings 404. As an example, the input ring 404A is divided into polygonal-shaped segments A1, B1, C1, D1, E1, F1, G1, H1, I1, J1, K1, and L.

FIGS. 2A, 3, and 4 are merely simplified example illustrations of input images 200, 300 and 400, for sake of clarity only, and should not unduly limit the scope of the claims herein. A person skilled in the art will recognize many variations, alternatives, and modifications of embodiments of the present disclosure.

Referring to FIGS. 5 and 6, illustrated are exemplary measurements pertaining to a given pixel of an input image, in accordance with different embodiments of the present disclosure.

In FIG. 5, there is shown an input image 500 that is divided into a first input portion 502 and a plurality of input rings 504 (individually depicted as input rings 504A, 504B and 504C) that are concentric with the first input portion 402. Each of the plurality of input rings 504 is divided into 4 trapezoidal segments. As shown, the given pixel P lies in a first trapezoidal segment A3 of a third input ring (from the centre O of the input image). Notably, 'L0' is a length of an edge of the first input portion 502, 'y' is a distance of a centre of the trapezoidal segment A3 from a corresponding edge of the first input portion 502, 'Lorig0' is a length (in pixels) of an inner edge of the trapezoidal segment A3, and 'Lorig1' is a length (in pixels) of an outer edge of the trapezoidal segment A3.

In FIG. 6, there is shown an input image 600 that is divided into a first input portion 602 and a plurality of input rings 604 (individually depicted as input rings 604A, 604B and 604C) that are concentric with the first input portion 602. Each of the plurality of input rings 604 is divided into rectangular-shaped tessellating segments. As shown, the given pixel P lies in a first segment A3 of a third input ring (from the centre O of the input image). Notably, 'Lorig' is a length (in pixels) of the segment A3, while 'F(P)' is a signed distance (in pixels) of the given pixel P from a central reference line (depicted as a dash-dot line) corresponding to the segment A3. Notably, F(P) is signed to be positive when the given pixel P lies towards a right side of said central reference line, and negative when the given pixel P lies towards a left side of said central reference line.

Figure 7:
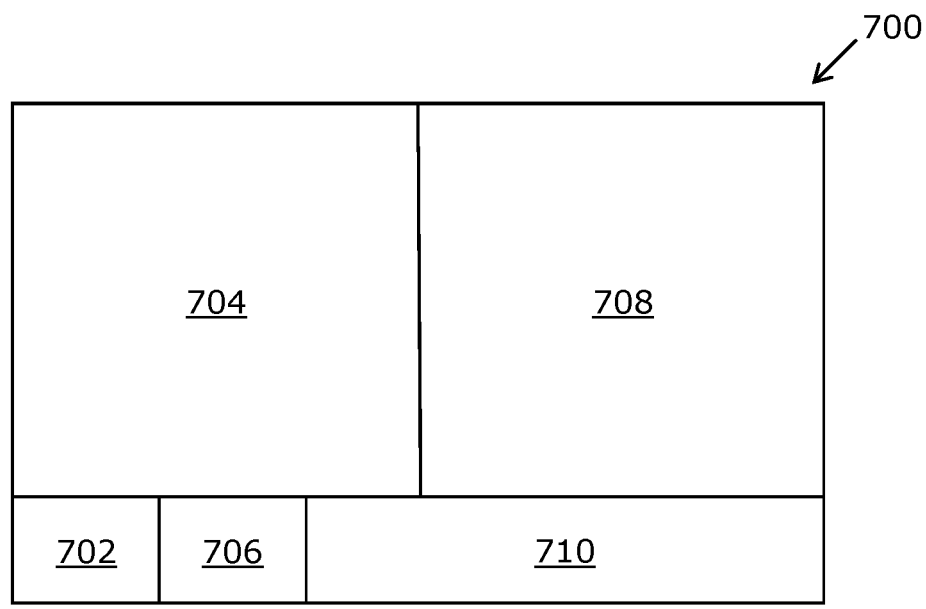
FIG. 7 illustrates an exemplary composite image, in accordance with an embodiment of the present disclosure.

Referring to FIG. 7, illustrated is an exemplary composite image 700, in accordance with an embodiment of the present disclosure. The composite image 700 comprises: a first image 702 and a second image 704 corresponding to a left eye of the user, a first image 706 and a second image 708 corresponding to a right eye of the user, and a padding area 710.

FIG. 7 is merely a simplified example illustration of the composite image 700, for sake of clarity only, and should not unduly limit the scope of the claims herein. A person skilled in the art will recognize many variations, alternatives, and modifications of embodiments of the present disclosure.

Figure 8:
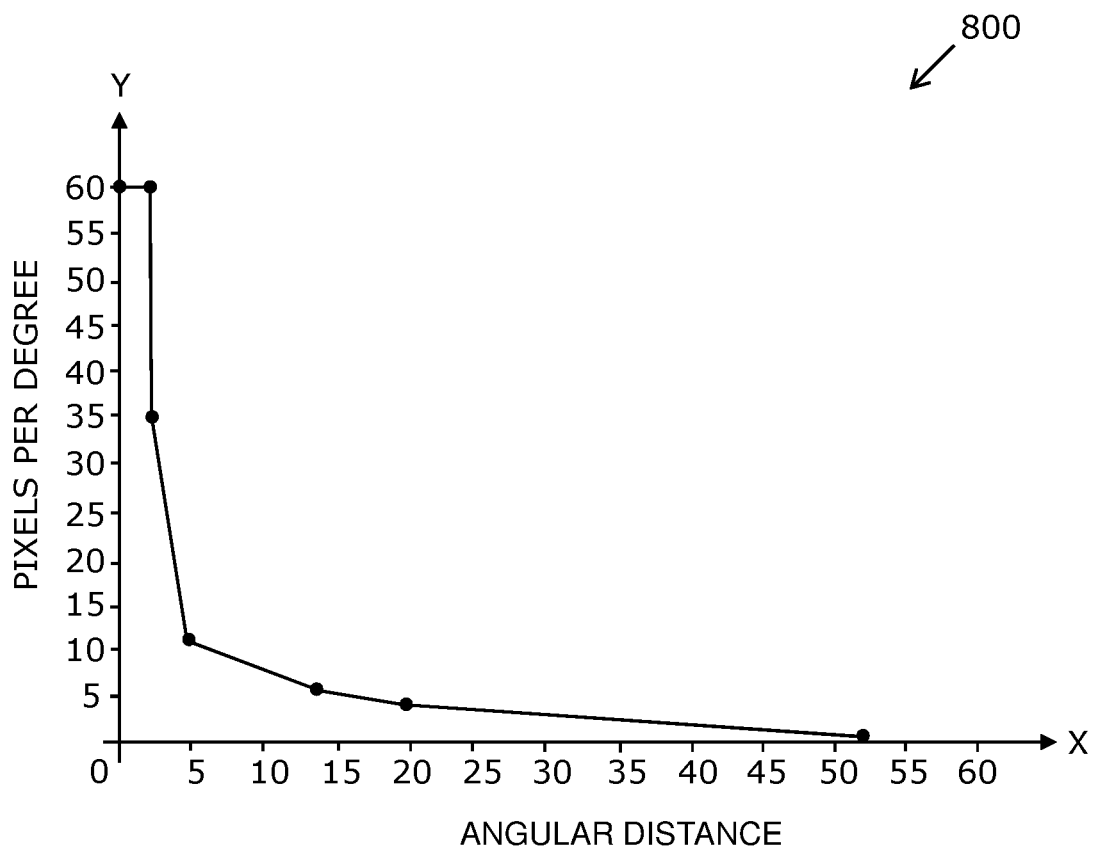
FIG. 8 illustrates an exemplary Pixels Per Degree (PPD) curve, in accordance with an embodiment of the present disclosure.

Referring to FIG. 8, illustrated is an exemplary Pixels Per Degree (PPD) curve 800, in accordance with an embodiment of the present disclosure. The PPD curve 800 defines a manner in which angular resolution (namely, pixels per degree) varies as a function of an angular distance between a centre of a plurality of input rings and a given input ring.

FIG. 8 is merely a simplified example illustration of the PPD curve 800, for sake of clarity only, and should not unduly limit the scope of the claims herein. A person skilled in the art will recognize many variations, alternatives, and modifications of embodiments of the present disclosure.

Figure 9:
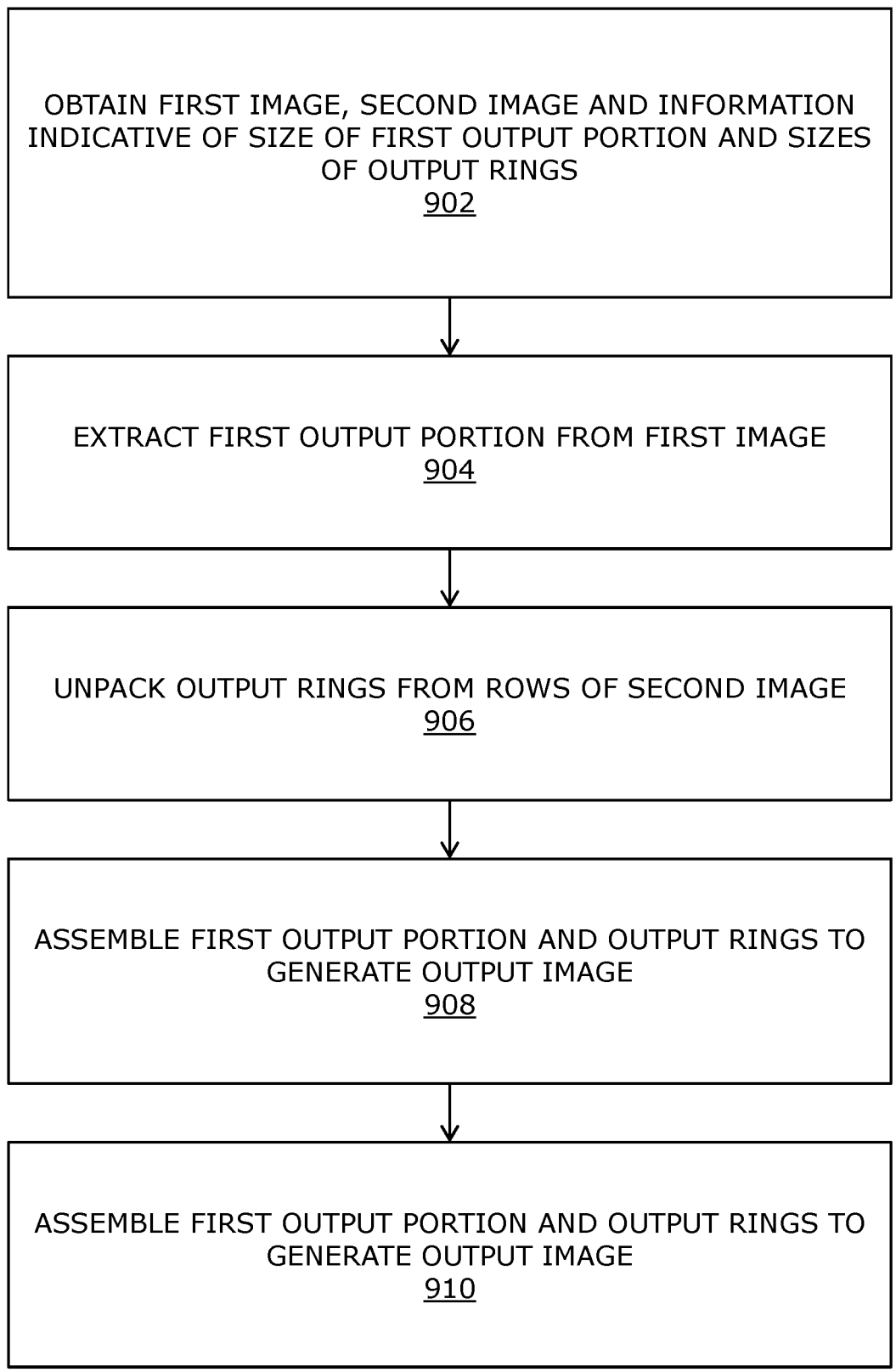
FIG. 9 illustrates steps of a method of decoding images, in accordance with an embodiment of the present disclosure.

Referring to FIG. 9, illustrated are steps of a method of decoding images, in accordance with an embodiment of the present disclosure. The method is implemented at a display apparatus. At step 902, a first image, a second image and information indicative of a size of a first output portion and sizes of a plurality of output rings are obtained. At step 904, the first output portion is extracted from the first image based on the size of the first output portion. The first output portion is shaped as a simple closed curve. At step 906, the plurality of output rings are unpacked from a plurality of rows of the second image based on the sizes of the plurality of output rings. The plurality of output rings are shaped as the simple closed curve. At step 908, the first output portion and the plurality of output rings are assembled to generate an output image. The plurality of output rings are concentred with the first output portion. At step 910, the output image is rendered via at least one image renderer of the display apparatus.

The steps 902, 904, 906, 908 and 910 are only illustrative and other alternatives can also be provided where one or more steps are added, one or more steps are removed, or one or more steps are provided in a different sequence without departing from the scope of the claims herein.

Figure 10:
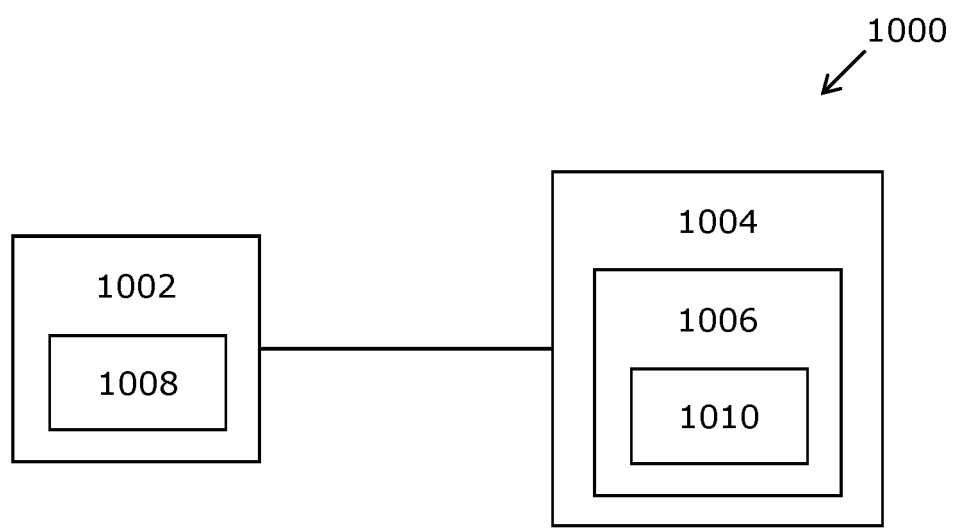
FIG. 10 illustrates an exemplary environment wherein a method of encoding images and a method of decoding images is implemented, in accordance with an embodiment of the present disclosure.

Referring to FIG. 10, illustrated is an exemplary environment 1000 wherein a method of encoding images and a method of decoding images is implemented, in accordance with an embodiment of the present disclosure. The method of encoding images is implemented via an encoder 1002, whereas the method of decoding images is implemented at a display apparatus 1004.

Specifically, at the display apparatus 1004, the method of decoding images is implemented via a decoder 1006. The encoder 1002 is communicably coupled to the display apparatus 1004 (and specifically, to the decoder 1006). The encoder 1002 comprises a processor 1008 configured to execute the method of encoding images, whereas the decoder 1006 comprises a processor 1010 configured to execute the method of decoding images.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of encoding images, the method comprising:
   dividing an input image into a first input portion and a plurality of input rings that are concentric with the first input portion, the first input portion and the plurality of input rings being shaped as a simple closed curve;
   storing the first input portion into a first image;
   packing the plurality of input rings into a second image, the second image having a plurality of rows, a given input ring of the input image being packed into a corresponding row of the second image; and
   communicating, to a display apparatus, the first image, the second image and information indicative of a size of the first input portion and sizes of the plurality of input rings.

2. The method of claim 1, wherein the first input portion and the plurality of input rings are centred at a centre of the input image.

3. The method of claim 1, further comprising:
   obtaining, from the display apparatus, information indicative of a gaze direction of a user; and
   determining a gaze point of the input image based on the gaze direction of the user,
   wherein the first input portion and the plurality of input rings are centred at the gaze point of the input image.

4. The method of claim 1, wherein the input image is divided into the first input portion and the plurality of input rings based on a function of an angular distance of a given input ring from a centre of the plurality of input rings, wherein thicknesses of the plurality of input rings increase on going from the centre towards a periphery of the input image according to said function, and wherein the plurality of rows of the second image have a same height.

5. The method of claim 1, wherein the input image is divided into the first input portion and the plurality of input rings in a manner that the plurality of input rings have a same thickness, wherein a height of a given row of the second image depends on a function of an angular distance of a corresponding input ring from a centre of the plurality of input rings.

6. The method of claim 1, further comprising communicating, to the display apparatus, information indicative of a function of an angular distance of a given input ring from a centre of the plurality of input rings.

7. The method of claim 1, wherein a length of each of the plurality of rows is smaller than or equal to a perimeter of the first input portion.

8. The method of claim 1, wherein the step of dividing the input image comprises dividing each of the plurality of input rings into M segments, wherein Nth segments of adjacent input rings are packed adjacently in corresponding adjacent rows of the second image.

9. The method of claim 8, wherein the simple closed curve is a polygon having M sides, wherein a given input ring is divided along lines passing through respective pairs of inner and outer corners of the given input ring.

10. The method of claim 8, wherein the step of packing a given input ring into a given row of the second image comprises generating a given pixel in the given row by combining a plurality of corresponding pixels in the given input ring.

11. A method of decoding images, the method being implemented at a display apparatus, the method comprising:
- obtaining a first image, a second image and information indicative of a size of a first output portion and sizes of a plurality of output rings;
- extracting the first output portion from the first image based on the size of the first output portion, the first output portion being shaped as a simple closed curve;
- unpacking the plurality of output rings from a plurality of rows of the second image based on the sizes of the plurality of output rings, the plurality of output rings being shaped as the simple closed curve;
- assembling the first output portion and the plurality of output rings to generate an output image, wherein the plurality of output rings are concentered with the first output portion; and
- rendering the output image via at least one image renderer of the display apparatus.

12. The method of claim 11, wherein the first output portion and the plurality of output rings are centred at a centre of the output image.

13. The method of claim 11, further comprising:
- detecting a gaze direction of a user; and
- determining a gaze point of the output image based on the gaze direction of the user, wherein the first output portion and the plurality of output rings are centred at the gaze point of the output image.

14. The method of claim 11, wherein the plurality of output rings are unpacked from the plurality of rows of the second image based on a function of an angular distance of a given output ring from a centre of the plurality of output rings, wherein thicknesses of the plurality of output rings increase on going from the centre towards a periphery of the output image according to said function, and wherein the plurality of rows of the second image have a same height.

15. The method of claim 11, wherein the plurality of output rings have a same thickness, wherein a height of a given row of the second image depends on a function of an angular distance of a corresponding output ring from a centre of the plurality of output rings.

16. The method of claim 11, further comprising obtaining information indicative of a function of an angular distance of a given output ring from a centre of the plurality of output rings.

17. The method of claim 11, wherein a length of each of the plurality of rows is smaller than or equal to a perimeter of the first output portion.

18. The method of claim 11, wherein the step of unpacking a given output ring from a given row of the second image comprises unpacking M segments of the given output ring from M columns of the given row, wherein Nth segments of adjacent output rings are unpacked from a same column of corresponding adjacent rows of the second image.

19. The method of claim 18, wherein the simple closed curve is a polygon having M sides, wherein the M segments of the given output ring are assembled sequentially to generate the given output ring.

20. The method of claim 18, wherein the step of unpacking the given output ring from the given row further comprises generating, from a given pixel in the given row, a plurality of corresponding pixels in the given output ring.

* * * * *